(12) United States Patent
Romanovskiy

(10) Patent No.: US 10,466,932 B2
(45) Date of Patent: Nov. 5, 2019

(54) CACHE DATA PLACEMENT FOR COMPRESSION IN DATA STORAGE SYSTEMS

(71) Applicant: EMC Corporation, Hopkinton, MA (US)

(72) Inventor: Alexey Valentinovich Romanovskiy, Vsevolozhsk (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/109,528

(22) PCT Filed: Jun. 30, 2015

(86) PCT No.: PCT/RU2015/000409
§ 371 (c)(1),
(2) Date: Jul. 1, 2016

(87) PCT Pub. No.: WO2015/199583
PCT Pub. Date: Dec. 30, 2015

(65) Prior Publication Data
US 2016/0335188 A1 Nov. 17, 2016

(30) Foreign Application Priority Data

Jun. 27, 2014 (WO) ................ PCT/RU2014/000470
Dec. 23, 2014 (WO) ................ PCT/RU2014/000971
Mar. 27, 2015 (WO) ................ PCT/RU2015/000190

(51) Int. Cl.
*G06F 12/00* (2006.01)
*G06F 3/06* (2006.01)
(Continued)

(52) U.S. Cl.
CPC ............ *G06F 3/0661* (2013.01); *G06F 3/064* (2013.01); *G06F 3/065* (2013.01); *G06F 3/067* (2013.01);
(Continued)

(58) Field of Classification Search
CPC ...... G06F 12/00; G06F 12/08; G06F 12/0802; G06F 12/0804; G06F 12/0806; G06F 12/0808; G06F 12/0811; G06F 12/0871
(Continued)

(56) References Cited

U.S. PATENT DOCUMENTS 5,239,643 A * 8/1993 Blount .................... G06F 12/08
5,732,238 A * 3/1998 Sarkozy ............. G06F 12/0866
711/135

(Continued)

*Primary Examiner* — Tuan V Thai
(74) *Attorney, Agent, or Firm* — Muirhead and Saturnelli, LLC

(57) ABSTRACT

A technique for managing data storage in a data storage system is disclosed. Data blocks are written to a data storage system cache, pluralities of the data blocks being organized into cache macro blocks, the IO cache macro blocks having a fixed size. Access requests for the data blocks are processed, wherein processing includes generating block access statics. Using access statics, data blocks stored in the cache macroblocks having block a access times that overlap are identified. Data blocks identified as having overlapping access times are rearranged into one or more overlap cache macroblocks. Data storage system cache memory is arranged into multiple input/output (IO) cache macroblocks, where a first set of IO cache macroblocks are configured as compressed IO cache macro blocks, each compressed IO cache macro block storing a plurality of variable sized compressed IO data blocks, and a second set of IO cache macroblocks are configured as non-compressed IO cache macroblocks, each non-compressed IO cache macroblock storing a plurality of fixed sized non-compressed IO data (Continued)

blocks. A write request is receive at the data storage system. If the IO data associated with the write request is determined to be compressible, the IO data is compressed in-line and written to an IO data block in a compressed IO cache macroblock, otherwise non-compressed IO data is written to an IO data block in a non-compressed IO cache macroblock.

15 Claims, 16 Drawing Sheets

(51) Int. Cl.

| | | |
|---|---|---|
| *G06F 12/02* | (2006.01) | |
| *G06F 12/0855* | (2016.01) | |
| *G06F 12/0868* | (2016.01) | |
| *G06F 12/123* | (2016.01) | |
| *G06F 12/0871* | (2016.01) | |
| *G06F 12/0873* | (2016.01) | |

(52) U.S. Cl.
CPC .......... *G06F 3/0608* (2013.01); *G06F 3/0619* (2013.01); *G06F 3/0652* (2013.01); *G06F 3/0673* (2013.01); *G06F 12/0246* (2013.01); *G06F 12/0261* (2013.01); *G06F 12/0855* (2013.01); *G06F 12/0868* (2013.01); *G06F 12/0871* (2013.01); *G06F 12/0873* (2013.01); *G06F 12/123* (2013.01); *G06F 2212/1024* (2013.01); *G06F 2212/1044* (2013.01); *G06F 2212/281* (2013.01); *G06F 2212/313* (2013.01); *G06F 2212/401* (2013.01); *G06F 2212/461* (2013.01); *G06F 2212/608* (2013.01); *G06F 2212/7205* (2013.01); *G06F 2212/7207* (2013.01)

(58) Field of Classification Search
USPC .................................. 711/100, 117, 118, 154
See application file for complete search history.

(56) References Cited

U.S. PATENT DOCUMENTS

| | | | | |
|---|---|---|---|---|
| 8,924,656 | B1* | 12/2014 | Usgaonkar | G06F 3/0614 711/103 |
| 2003/0225974 | A1* | 12/2003 | Bopardikar | G06F 12/121 711/133 |
| 2004/0030847 | A1* | 2/2004 | Tremaine | G06F 12/023 711/154 |
| 2006/0069843 | A1 | 3/2006 | Emma et al. | |
| 2010/0042776 | A1* | 2/2010 | Seo | G06F 12/123 711/103 |
| 2012/0185648 | A1* | 7/2012 | Benhase | G06F 12/08 711/118 |
| 2016/0224471 | A1* | 8/2016 | Avudaiyappan | G06F 12/1054 |

* cited by examiner

Fig. 2A

First Segment

| #1 | #2 | #3 | #4 | #5 | #6 | #7 | #8 |
|---|---|---|---|---|---|---|---|

70(a)

58(c)

| 6,144 bytes | 6,656 bytes | 6,144 bytes | 6,144 bytes | 6,144 bytes | 0 | 0 | ... |
|---|---|---|---|---|---|---|---|

| 88(a) Active Data Block | 90 Inactive Data Block | 88(f) Active Data Block | 58(a) Metadata | 90 Inactive Data Block | 88(j) Active Data Block | 58(b) Metadata | 58(c) Metadata |
|---|---|---|---|---|---|---|---|
| 88(b) Active Data Block | 90 Inactive Data Block | 88(g) Active Data Block | 92(a) | 90 Inactive Data Block | 88(k) Active Data Block | 94 | 92(c) |
| 90 Inactive Data Block | 88(d) Active Data Block | 88(h) Active Data Block | 94 | 90 Inactive Data Block | 88(l) Active Data Block | 92(b) | 94 |
| 88(c) Active Data Block | 88(e) Active Data Block | 88(i) Active Data Block | 94 | 90 Inactive Data Block | 90 Inactive Data Block | 94 | 92(e) |
| | | | 94 | | | 94 | 94 |
| Macroblock 1 | Macroblock 2 | Macroblock 3 | Macroblock 4 | Macroblock 5 | Macroblock 6 | Macroblock 7 | Macroblock 8 |

| 60 | 60 | 60 | 60 | 60 | 60 | 60 | 60 |
|---|---|---|---|---|---|---|---|
| Macroblock 9 | Macroblock 10 | Macroblock 11 | Macroblock 12 | Macroblock 13 | Macroblock 14 | Macroblock 15 | Macroblock 16 |

Fig. 2B

Second Segment

| #9 | #10 | #3 | #11 | | | | | 70(b) |

| | | 88(f) Active Data Block | | | | | |
|---|---|---|---|---|---|---|---|
| 60 | 60 | 88(g) Active Data Block | 60 | 60 | 60 | 60 | 60 |
| | | 88(h) Active Data Block | | | | | |
| | | 88(i) Active Data Block | | | | | |

Macroblock 1, Macroblock 2, Macroblock 3, Macroblock 4, Macroblock 5, Macroblock 6, Macroblock 7, Macroblock 8

58(d)

| 6,144 bytes | 6,144 bytes | 6,144 bytes | 6,656 bytes | 6,144 bytes | 0 | 0 | • • • |

| 88(a) Active Data Block | 88(e) Active Data Block | 58(d) Metadata | | | | | |
|---|---|---|---|---|---|---|---|
| | | 92(a) | | | | | |
| 88(b) Active Data Block | 88(j) Active Data Block | 92(b) | | | | | |
| 88(c) Active Data Block | 88(k) Active Data Block | 92(c) | | | | | |
| | | 92(d) | | | | | |
| 88(d) Active Data Block | 88(l) Active Data Block | 92(e) | | | | | |

Macroblock 9, Macroblock 10, Macroblock 11, Macroblock 12, Macroblock 13, Macroblock 14, Macroblock 15, Macroblock 16

Fig. 6
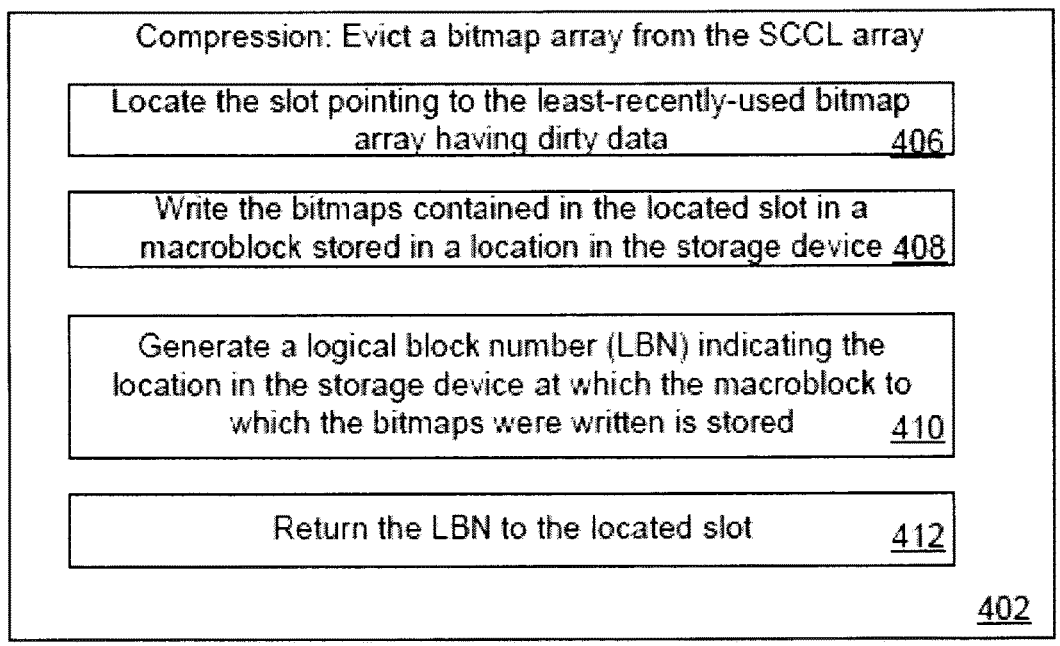
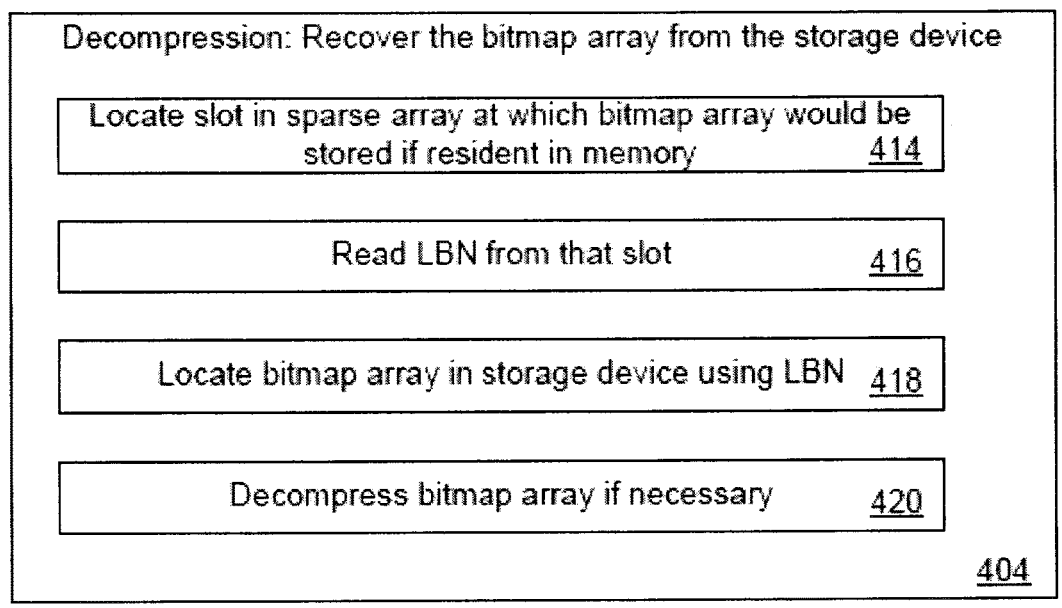

Backpointer Array 630 recovered from storage device and decompressed using IC Key

CACHE DATA PLACEMENT FOR COMPRESSION IN DATA STORAGE SYSTEMS

CROSS REFERENCE TO RELATED APPLICATIONS

This Patent Application is a continuation-in-part of PCT application number PCT/RU2015/000190, filed 27 Mar. 2015, entitled "MANAGING CACHE COMPRESSION IN DATA STORAGE SYSTEMS" which is a continuation in part of PCT application number PCT/RU2014/000971, filed 23 Dec. 2014, entitled "METADATA STRUCTURES FOR LOW LATENCY AND HIGH THROUGHPUT INLINE DATA COMPRESSION" which is a continuation-in-part of PCT application number PCT/RU2014/000470, filed 27 Jun. 2014, entitled "TECHNIQUES FOR AUTOMATICALLY FREEING SPACE IN A LOG-STRUCTURED STORAGE SYSTEM."

BACKGROUND

Technical Field

This application relates generally to managing cache data placement for improving data compression in data storage systems.

Description of Related Art

Data storage systems are arrangements of hardware and software that include storage processors coupled to arrays of non-volatile storage devices. In typical operation, storage processors service storage requests that arrive from client machines. These storage requests may specify files or other data elements to be written, read, created, or deleted. The storage processors run software that manages incoming storage requests and performs various data processing tasks to organize and secure the data stored on the non-volatile storage devices.

Some data storage systems store data in discrete units called data blocks and provide each data block with a physical address in storage. Such block-based data storage systems have metadata to describe the data stored in the blocks. The speed of such data storage systems may be optimized by sequentially writing data blocks, similar to a log-structured file system.

SUMMARY OF THE INVENTION

A technique for managing data storage in a data storage system is disclosed. Data blocks are written to a data storage system cache, pluralities of the data blocks being organized into cache macroblocks, the IO cache macroblocks having a fixed size. Access requests for the data blocks are processed, wherein processing includes generating block access statics. Using access statics, data blocks stored in the cache macroblocks having block a access times that overlap are identified. Data blocks identified as having overlapping access times are rearranged into one or more overlap cache macroblocks.

BRIEF DESCRIPTION OF THE DRAWINGS

Features and advantages of the present invention will become more apparent from the following detailed description of exemplary embodiments thereof taken in conjunction with the accompanying drawings in which:

FIG. 2A depicts an example block layout at a first time for use in conjunction with various embodiments.

FIG. 2B depicts a revised example block layout upon performance of a method according to various embodiments.

FIG. 6 depicts an example process of evicting and recovering macroblock metadata from volatile memory.

DETAILED DESCRIPTION OF EMBODIMENT(S)

This specification is organized into four sections. The first section provides a general discussion of the data storage system that implements the improved techniques. The second section describes a data storage system implementing a garbage collection or defragmentation system to allow fragmented macroblocks to be combined with other fragmented macroblocks, thereby allowing macroblocks to be freed. The third describes a data storage system implementing compression of block and macroblock metadata. The fourth describes a data storage system implementing cache compression of block and macroblock data.

1. Introduction

Figure 1:
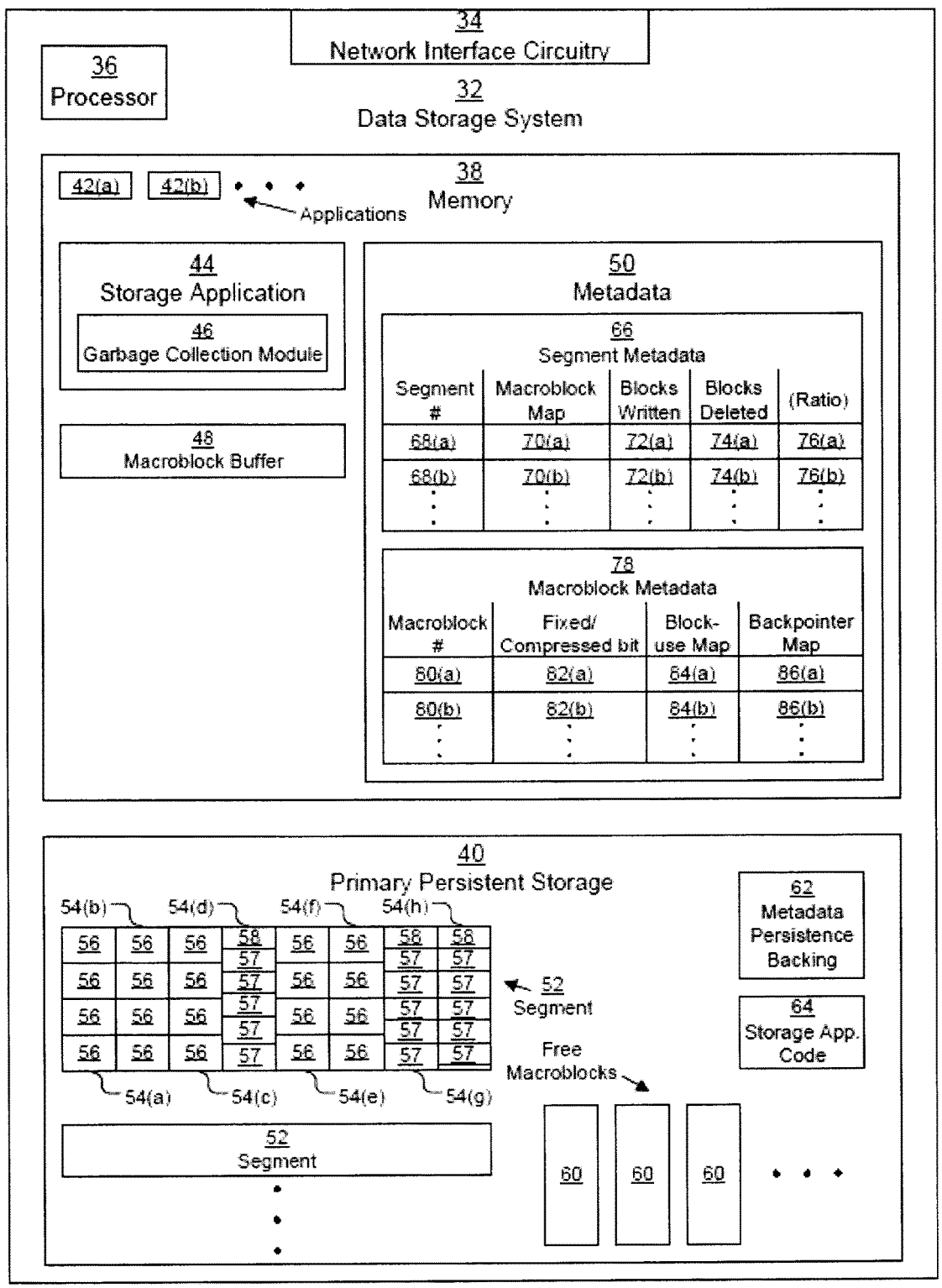
FIG. 1 depicts an example data storage system according to various embodiments.

FIG. 1 depicts an example data storage system (DSS) 32. DSS 32 may be any kind of computing device that provides storage, such as, for example, a personal computer, a workstation computer, a server computer, an enterprise server computer, a laptop computer, a tablet computer, a smart phone, etc. Typically, however, DSS 32 will be a data storage array, such as, for example, a VNX®, VNXe®, or CLARiiON® CX4 data storage array provided by the EMC Corporation of Hopkinton, Mass.

DSS 32 includes a processor, 36, system memory 38, and primary persistent storage 40. In some embodiments, DSS 32 also includes network interface circuitry 34 for communicating with one or more host devices configured to send data storage commands to the DSS 32. Network interface circuitry 34 may include one or more Ethernet cards, cellular modems, Wireless Fidelity (WiFi) wireless networking adapters, any other devices for connecting to a network, or some combination thereof.

Processor 36 may be any kind of processor or set of processors configured to perform operations, such as, for example, a microprocessor, a multi-core microprocessor, a digital signal processor, a system on a chip, a collection of electronic circuits, a similar kind of controller, or any combination of the above. Processor 36 may also include processing circuitry configured to control and connect to the primary persistent storage 40.

Memory 38 may be any kind of digital system memory, such as, for example, random access memory (RAM). Memory 38 stores an operating system (OS) (not depicted, e.g., Linux, UNIX, Windows, or a similar operating system) and one or more applications 42 (depicted as applications 42(*a*), 42(*b*), . . . ) executing on processor 36 as well as data used by those applications 42.

It should be understood that network interface circuitry 34, processor 36, and memory 38 interconnect, and they all may reside on a storage processor board or motherboard of the DSS 32. There may be multiple independent storage processor boards per DSS 32, arranged in a highly-available fault-tolerant manner.

Primary persistent storage 40 may be made up of a set of persistent storage devices, such as, for example, hard disk drives, solid-state storage devices, flash drives, etc. Primary persistent storage 40 is configured to store blocks 56, 57 of data within macroblocks 54 so as to be easily accessible to applications 42 via storage application 44. In some embodiments, DSS 32 may include (or otherwise have access to) secondary persistent storage (not depicted), which is used for secondary purposes, such as backup. Secondary persistent storage may include, for example, tape or optical storage.

Memory 38 also stores a storage application 44 as it executes on processor 36, as well as a macroblock buffer 48 and metadata 50. Storage application 44 is an application that receives and processes storage commands from applications 42 (or, via network interface circuitry 34, from other applications executing on remote host devices) that are directed to the primary persistent storage 40. Part of storage application 44 is a garbage collection module 46, which is configured to perform defragmenting garbage collection on primary persistent storage 40 with reference to the metadata 50. In some embodiments, metadata 50 may be backed up onto metadata persistence backing 62 on primary persistent storage 40 or some other non-volatile storage.

Typically, code for the OS, applications 42, storage application 44, and garbage collection module 46 is also stored within some form of persistent storage, either on a dedicated persistent boot drive or within the primary persistent storage 40, so that these components can be loaded into system memory 38 upon startup. An application or module 42, 44, 46, when stored in non-transient form either in system memory 38 or in persistent storage, forms a computer program product. The processor 36 running one or more of these applications of modules 42, 44, 46 thus forms a specialized circuit constructed and arranged to carry out various processes described herein. Code for storage application 44 is depicted as being stored as code 64 within primary persistent storage 40.

Storage application 44 stores data blocks received from applications 42 as either uncompressed blocks 56 or compressed blocks 57 on primary persistent storage 40. Typically, storage application 44 stores these blocks 56, 57 in sequential order within a macroblock 54 and writes macroblock metadata 78 regarding each macroblock 54 to memory 38 within metadata 50.

Each macroblock 54 is a contiguous region of storage (i.e., having contiguous addresses) within primary persistent storage 40. In addition to used macroblocks 54, primary persistent storage 40 may also include a set of free macroblocks 60, which are not currently allocated to store any data blocks 56, 57. Typically, all macroblocks 54, 60 have a fixed size, and uncompressed blocks 56 have a different, smaller, fixed size. In one embodiment, each macroblock 54, 60 is 64 kilobytes in size, which allows it to store eight 8-kilobyte uncompressed blocks 56. In another embodiment, each macroblock 54, 60 is 1 megabyte in size, which allows it to store sixteen 64-kilobyte uncompressed blocks 56. However, as depicted, for the sake of simplicity, each macroblock 54, 60 can store four blocks 56 (for example, each macroblock 54, 60 is 32 kilobytes, capable of storing four 8-kilobyte blocks 56).

In some embodiments, instead of storing uncompressed data blocks 56, some of the macroblocks 54 may be configured to store several compressed blocks 57. In such embodiments, these macroblocks (e.g., 54(*d*), 54(*f*), 54(*h*)) configured to store compressed blocks 57 have a header 58 which stores macroblock-level metadata. Typically, a macroblock 54 only stores compressed blocks 57 if there is enough room within the macroblock 54 to store more compressed blocks 57 than it could store uncompressed blocks 56. Thus, since, as depicted, a macroblock 54, 60 can store four 8-kilobyte uncompressed blocks 56, a macroblock 54 only stores compressed blocks 57 if it can hold at least five compressed blocks 57 (see, e.g., macroblocks 54(*d*), 54(*f*), 54(*h*)).

Each allocated macroblock 54, 60 has associated macroblock metadata 78 and each allocated block 56-58 has associated block metadata (described in further detail below). In an example embodiment, these are "allocated" elements because corresponding data structures are sparse arrays; therefore, if a number of sequential blocks/macroblocks are not allocated the sparse array does not have respective elements. Typically, primary persistent storage 40 is divided in advance into a fixed number of macroblocks 54, 60. In some embodiments, primary persistent storage 40 is configured to store up to eight petabytes ($2^{53}$ bytes) of application data. Thus, in embodiments having a fixed macroblock size of 1 megabyte ($2^{20}$ bytes), each macroblock 54, 60 has an associated 33-bit macroblock number 80 (depicted as macroblock numbers 80(*a*), 80(*b*), . . . ), representing numbers from zero to $2^{33}-1$. Similarly, in embodiments having a fixed macroblock size of 64 kilobytes ($2^{16}$ bytes), each macroblock 54, 60 has an associated 37-bit macroblock number 80, representing numbers from zero to $2^{37}-1$. Macroblock metadata 78 is depicted as a table indexed to the macroblock number 80, with several columns for metadata elements 82, 84, 86, although this is by way of example only. In other embodiments, each metadata element 82, 84, 86 may be stored within a separate array indexed by the macroblock numbers 80, and in yet other embodiments, groups of metadata elements (e.g., 82, 84) may be combined into a single such array. (Further details of such a single array will be described in connection with FIG. 4 below.) However, for purposes of simplicity of description, each metadata element 82, 84, 86 will be described as being stored within a column of a table indexed to the macroblock number 80.

Metadata element 82 stores a single bit flag per macroblock 54, 60, which indicates whether (1) the associated macroblock 54 is configured to store uncompressed data blocks 56 or (0) the associated macroblock 54 is configured to store compressed data blocks 57.

Block-use map element 84 stores a bitmap per macroblock 54, 60. Block-use map element 84 stores one bit per block 56, 57 for up to a maximum number of compressed blocks 56 allowed per macroblock 54, 60. In the case of a macroblock 54 configured to store uncompressed blocks 56, only the first few bits are utilized within block-use map element 84. Thus, in one embodiment, block-use map element 84 contains 63 bits, particularly if block-use map element 84 is stored in conjunction with metadata element 82, the metadata element 82 being the first bit of a long 64-bit integer, and the block-use map element 84 being the last 63 bits of the long 64-bit integer. (Further details of such a block-use map will be described in connection with FIG. 4 below.)

In the case of a macroblock 54 configured to store uncompressed blocks 56, only the first four or eight or sixteen (depending on the embodiment) bits of the block-use map element 84 are actually considered. If one of these initial bits of the block-use map element 84 stores a one (1), then the corresponding uncompressed block 56 stores active data, which means it has had data written to it, and it has not yet been deleted or rewritten. If, on the other hand, one of these initial bits of the block-use map element 84 stores a zero (0), then the corresponding compressed block 56 does not store active data, which means it has either been deleted or rewritten. However, any bit after the first four, eight, or sixteen (or whatever number of uncompressed blocks is able to fit in a macroblock 54, depending on the embodiment) bits does not actually represent any block 56 (i.e., that macroblock 54 is only configured to store 4, 8, 16, etc. uncompressed blocks 56, so any bit after those initial bits will be zero by default).

Turning now to the case of a macroblock 54 configured to store compressed blocks 57, only the first m bits are considered, where m represents the number of compressed blocks 57 assigned to that macroblock 54. If one of these first m bits of the block-use map element 84 stores a one (1), then the corresponding compressed block 57 stores active data, which means it has had data written to it, and it has not yet been deleted or rewritten. On the other hand, if one of these first m bits of the block-use map element 84 stores a zero (0), then the corresponding compressed block 57 does not store active data, which means it has either been deleted or rewritten. However, any bit after the first m bits does not actually represent any block 57 (i.e., that macroblock 54 is only configured to store m compressed blocks 57, so any bit after the first m bits will be zero by default).

Backpointer map (block metadata) element 86 stores, for each block 56, 57 within a respective macroblock 54, a pointer back to a block parent data structure of a respective application 42 that was responsible for creating that block 56, 57. (The backpointer map is an example of block metadata.) The block parent data structure is used by applications 42 to access blocks 56, 57, e.g. to read, delete, or over-write respective blocks 56, 57, to construct files/objects consisting of blocks, etc. Thus, if DSS 32 is configured to store up to eight petabytes (253 bytes) of application data, then the backpointers may each be at least 64 bits, and there should be enough space allocated within macroblock metadata 78 to store up to the maximum number of compressed blocks 57 allowed per macroblock 54 (e.g., up to 63 compressed blocks 57 are allowed, so 63×64 bits=4,032 bits=504 bytes, which may be rounded up to 512 bytes, of storage allocated within the backpointer map element 86 for each macroblock 54). Combining backpointer map elements 86 for several macroblocks 54 to fit into a single block, e.g. 8 kilobytes or 64 kilobytes, one can apply compression to such a block storing a combination of backpointer map elements. Indeed, one could even store backpointer map elements 86 within regular compressed blocks 57 in macroblocks 54 on storage 40.

As storage application 44 stores blocks 56, 57 sequentially within macroblocks 54, storage application 44 may temporarily buffer the macroblocks 54 in macroblock buffer 48 within memory 38. This allows an entire macroblock 54 to be written in one contiguous write operation.

2. Garbage Collection

As storage application 44 stores blocks 56, 57 sequentially within macroblocks 54, storage application 44 organizes the macroblocks 54 into segments 52. Each segment 52 contains a fixed number of macroblocks 54 (which, recall, have a fixed size). Storage application 44 is able to organize the segments 52 with reference to segment metadata 66 within memory 38. Whenever a newly-added macroblock 54 is created by storage application 44, storage application 44 may define a new segment 52 having a respective segment number 68, which indexes into segment metadata 66. Thus, primary persistent storage 40 may be logically organized into a number of segments 52. Recall that, in some embodiments, primary persistent storage 40 is configured to store up to eight petabytes (253 bytes) of application data, and in some embodiments, each macroblock has a fixed size of 1 megabyte, while in other embodiments, each macroblock has a fixed size of 64 kilobytes. In some embodiments in which each macroblock has a fixed size of 1 megabyte, each segment 52 may be configured to contain up to 128 macroblocks 54, for a total fixed segment size of 128 megabytes (227 bytes). In such embodiments, each segment 52 would have an associated 26-bit segment number 68, representing numbers from zero to 226-1. Similarly, in some embodiments in which each macroblock has a fixed size of 64 kilobytes, each segment 52 may be configured to contain up to 32 macroblocks 54, for a total fixed segment size of 2 megabytes (221 bytes). In such embodiments, each segment 52 would have an associated 32-bit segment number 68, representing numbers from zero to 232-1.

Example segment metadata 66 is depicted as a table indexed to the segment number 68, with several columns for metadata elements 70, 72, 74, 76. In other embodiments, each metadata element 70, 72, 74, 76 may be stored within a separate array indexed by the segment numbers 68, and in yet other embodiments, groups of metadata elements may be combined into a single such array. However, for purposes of simplicity of description, each metadata element 70, 72, 74, 76 will be described as being stored within a column of a table indexed to the segment number 68.

Macroblock map element 70 stores a fixed number of references to the macroblocks 54 which make up each segment 52. Thus, in the embodiment as depicted (in which each segment 52 includes eight macroblocks 54), if a segment 52 having segment number 68(a) contains macroblocks 54(a), 54(b), . . . , 54(h), with respective macroblock numbers 80(a), 80(b), . . . , 80(h), then the macroblock map 70(a) indexed by segment number 68(a) contains the macroblock numbers 80(a), 80(b), . . . , 80(h) in sequence. As storage application 44 inserts each macroblock 54 into a segment 52, storage application 44 inserts the respective macroblock number 80 for that macroblock 54 into the macroblock map element 70 for that segment 52.

Blocks written element 72 is a counter variable which counts the number of blocks 56, 57 which have been written to a segment 52 since it was initialized. Thus, once storage application 44 begins assigning new macroblocks 54 to a new segment 52, the counter is initialized to zero, and storage application 44 increments the counter of the blocks written element 72 for each block 56, 57 within the newly-added macroblock 54.

Similarly, blocks deleted element 74 is a counter variable which counts the number of blocks 56, 57 which have been deleted from a segment 52 since it was initialized. Thus, once storage application 44 begins assigning new macroblocks 54 to a new segment 52, the counter is initialized to zero, and storage application 44 increments the counter of the blocks deleted element 74 for every block 56, 57 that is deleted or rewritten (since rewritten blocks are written to a new location instead of being overwritten, effectively deleting the block at the initial location) from macroblocks 54 organized into that segment 52.

In some embodiments, a ratio 76 of the blocks deleted element 74 to the blocks written element 72 is also stored within the segment metadata 66 for each segment number 68. Higher ratios 76 tend to correspond to more highly fragmented segments.

Garbage collection module 46 operates by repeatedly calculating the ratio 76 for each segment 52 and deciding, based upon the calculated ratios 76, which segments 52 to schedule for defragmenting garbage collection. In some embodiments, whenever a ratio 76 for a given segment 52 exceeds a threshold value, that segment 52 is scheduled for defragmenting garbage collection. For example, in an environment in which a lack of fragmentation is desired at the expense of speed, a threshold value of 0.2 (20% fragmentation) may be used, while in an environment in which speed is prioritized heavily, a threshold value of 0.8 (80% fragmentation) may be used. In some embodiments, even once a particular segment 52 is scheduled for defragmenting garbage collection, certain segments 52 may be prioritized over other segments for defragmenting garbage collection by assigning more highly fragmented segments 52 to be scheduled first.

The process of defragmenting garbage collection may be illustrated with respect to FIGS. 2A and 2B.

FIG. 2A illustrates a layout of a particular first segment 52 and its associated macroblocks 54, 60 just prior to defragmenting garbage collection. First segment 52 with segment number 68(*a*) has respective macroblock map 70(*a*), which is depicted in FIG. 2A. The macroblock map 70(*a*) indicates that the first segment 52 is made up of macroblocks 1-8, sequentially. Macroblocks 54 numbered 1-8 are illustrated as being populated with both active and inactive blocks 56, 57, while macroblocks 60 numbered 9-16 are shown as being free.

Thus, macroblock 1, which is configured to contain uncompressed data blocks 56, contains three active data blocks 88(*a*), 88(*b*), and 88(*c*) together with one inactive (deleted or rewritten) data block 90. Similarly, macroblock 2, which is also configured to contain uncompressed data blocks 56, contains two active data blocks 88(*d*) and 88(*e*) together with two inactive data blocks 90, and macroblock 6, which is also configured to contain uncompressed data blocks 56, contains three active data blocks 88(*f*), 88(*g*), and 88(*h*) together with one inactive data block 90. Macroblock 5, which is configured to contain uncompressed data blocks 56, now contains no active data blocks 88, but is rather entirely made up of inactive data blocks 90.

Macroblocks 4, 7, and 8 are configured to contain compressed data blocks 57 of varying sizes following metadata headers 58. However, as depicted, many of the compressed data blocks 57 within macroblocks 4, 7, and 8 are inactive compressed data blocks 94. Only a few active compressed data blocks 92 (depicted as active compressed data block 92(*a*) within macroblock 4, active compressed data block 92(*b*) within macroblock 7, and active compressed data blocks 92(*c*), 92(*d*), 92(*e*) within macroblock 8) remain.

FIG. 2A also illustrates example metadata header 58(*c*) for macroblock 8 in detail. Metadata header 58(*c*) includes a map of the sizes of the compressed blocks 57 within macroblock 8. This map has as many elements as permissible compressed blocks 57 are allowed within a given macroblock 52. In one embodiment, up to 63 compressed blocks are allowed within a macroblock 54. Thus, macroblock map 58(*c*) would have 63 elements. As depicted, each macroblock is 32 kilobytes in size (although, in other embodiments, other fixed sizes may be used), making each uncompressed block 56 eight kilobytes in size. Thus, each compressed block 57 must be smaller than eight kilobytes in size, and there must be at least five (i.e., more than four) compressed blocks 57 in any macroblock 54 configured to store compressed blocks 57. Thus, each element of the macroblock map should be able to store a size value up to 8,191 bytes, which would require 13 bits (assuming a single byte resolution for the size). Thus, in one embodiment, metadata header 58(*c*) includes 63 13-bit elements. In other embodiments, for ease of calculation, each element may be a short integer having 16 bits, so metadata header 58(*c*) includes 63 16-bit elements, which takes up to 126 bytes. Thus, in one embodiment the size of each metadata header 58 is fixed at one kilobyte (leaving room for other metadata), leaving 31 kilobytes available for compressed data blocks 57. Since macroblock 8 contains five compressed data blocks 57, only the first five elements of the metadata header 58(*c*) contain size values. As depicted, these first five values are 6,144 bytes, 6,656 bytes, 6,144 bytes, 6,144 bytes, and 6,144 bytes, in sequence. Since these values only sum to 30.5 kilobytes, there is an extra 512 bytes of unused space at the end of macroblock 8.

FIG. 2B illustrates a layout of a new second segment 52 and its associated macroblocks 54, 60 just after defragmenting garbage collection of the first segment 52 (defined by macroblock map 70(*a*) from FIG. 2A). Second segment 52 with segment number 68(*b*) has respective macroblock map 70(*b*). The macroblock map 70(*b*) indicates that the second segment 52 is made up of macroblocks 9, 10, 3, and 11, sequentially. Macroblocks 54 numbered 3 and 9-11 are illustrated as being populated with active blocks 56, 57, while macroblocks 60 numbered 1, 2, 4-8, and 12-16 are shown as being free. This is because active data blocks 88(*a*)-88(*h*) from macroblocks 1, 2, and 6 were compacted into just two new macroblocks 9 and 10 in the defragmenting garbage collection process, while active compressed data blocks 92(*a*)-92(*e*) from macroblocks 4, 7, and 8 were compacted into just one new macroblock 11 (with new metadata header 58(*d*) shown in detail). Because macroblocks 1, 2, 4, and 6-8 were compacted, these macroblocks were able to be freed. In addition, because macroblock 5 contained only inactive data blocks 90 prior to compaction, macroblock 5 was also able to be freed. However, since macroblock 3 did not contain any inactive data blocks 90, 92, but only active data blocks 88(*f*)-88(*i*), macroblock 3 is maintained in place, but transferred to the new unfragmented second segment 52 with segment number 70(*b*). Because inactive data has been removed (or, more accurately, not transferred), the second segment 52 has empty positions for additional macroblocks 54 to be inserted from the pool of free macroblocks 60 as new data is written by applications 42.

It should be understood that in order to efficiently pack variable-sized compressed blocks 57 from an initial set of macroblocks 54 into one or more new macroblocks 54, efficient bin-packing algorithms may be used. Examples of such efficient bin-packing algorithms may be found in "LOWER BOUNDS AND REDUCTION PROCEDURES FOR THE BIN PACKING PROBLEM" BY Silvano Martello and Paolo Toth, published in Discrete Applied Mathematics 28 (1990) at pages 59-70, published by Elsevier Science Publishers B.V. (North-Holland), the entire contents and teachings of which are hereby incorporated by reference herein.

Figure 3:
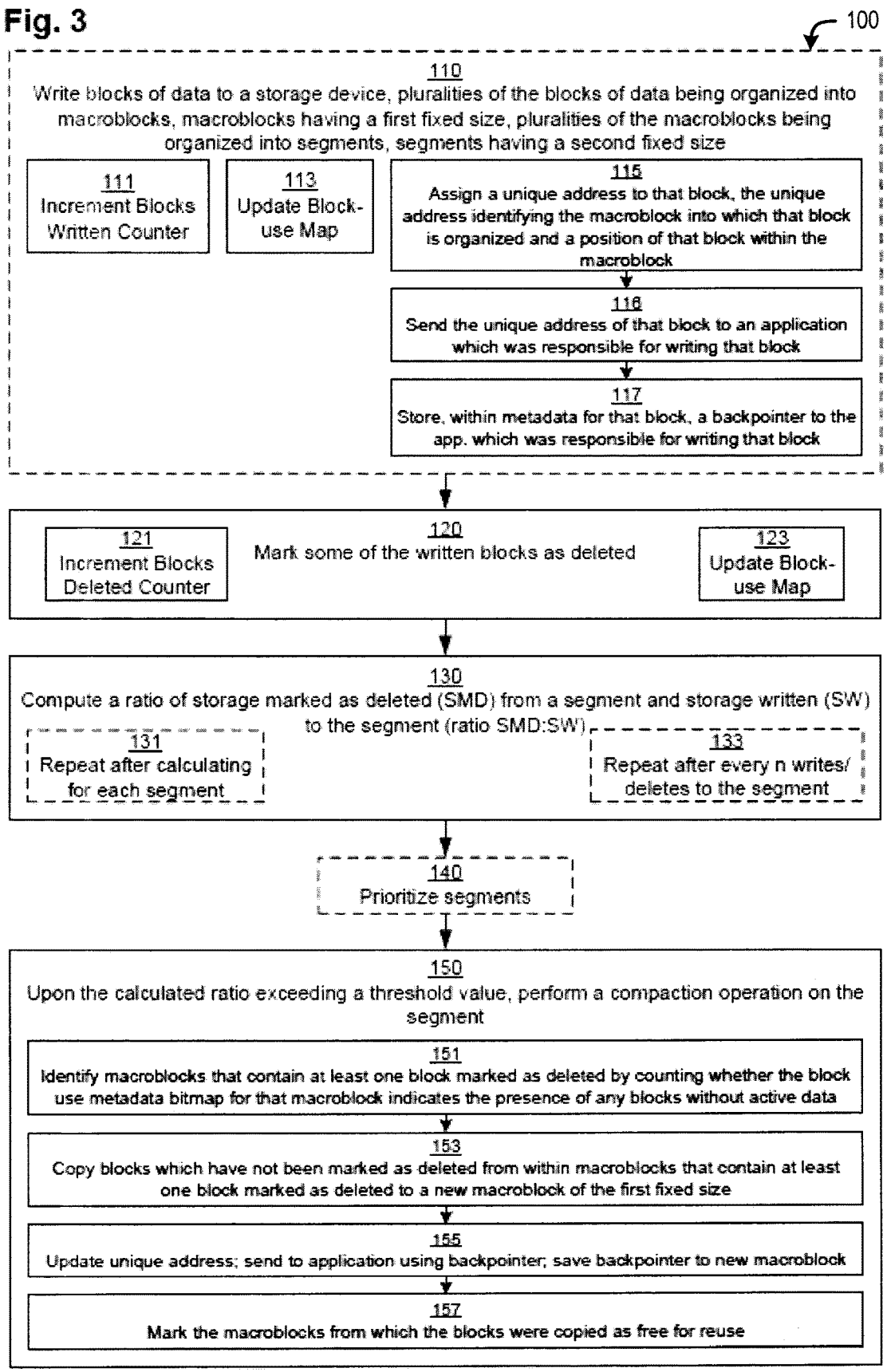
FIG. 3 depicts an example method according to various embodiments.

FIG. 3 illustrates an example method 100 according to various embodiments for defragmenting garbage collection in a DSS 32. It should be understood that any time a piece of software, such as, for example, storage application 44 or garbage collection module 46, is described as performing a method, process, step, or function, in actuality what is meant is that a computing device (e.g., DSS 32) on which that piece of software 44, 46 is running performs the method, process, step, or function when executing that piece of software on its processor 36.

It should be understood that, within FIG. 3, steps 110 and 140 are dashed because they are optional and not fundamental to method 100.

In preliminary step 110 of method 100, storage application 44 writes data blocks (e.g. 56, 57) to a storage device (e.g., primary persistent storage 40), pluralities of the blocks 56, 57 being organized into macroblocks 54, the macroblocks 54 having a first fixed size (e.g., 32 kilobytes, 64 kilobytes, or 1 megabyte), pluralities of the macroblocks 54 being organized into segments 52, segments having a second fixed size (e.g., 256 kilobytes, 2 megabytes, or 128 megabytes). As this is done, various sub-steps may also be performed.

In sub-step 111, as each additional data block 56, 57 is written to a macroblock 54 of a segment 52 by storage application 44, storage application 44 (in some embodiments, through the action of garbage collection module 46) increments a counter of the blocks written element 72 for that segment 52 within metadata 50 within memory 38, as described above.

In sub-step 113, as each additional data block 56, 57 is written to a macroblock 54 by storage application 44, storage application 44 updates the block-use map element 84 for that macroblock 54 within metadata 50 within memory 38 by marking that block 56, 57 as active, as described above.

In sub-steps 115-117, as each additional data block 56, 57 is written to a macroblock 54 by storage application 44, storage application 44 updates the backpointer map element 86 for that macroblock 54.

In particular, in sub-step 115, storage application 44 assigns a unique address to the newly-written data block 56, 57, the unique address identifying the macroblock 54 into which that block 56, 57 is organized and a position of the block 56, 57 within the macroblock 54. For example, the unique address may be a 64-bit value including the 33 or 37 bits of the macroblock number 80 and 6 bits of the block number within the macroblock 54 (recalling that, in some embodiments, there may be up to 63 compressed blocks 57 per macroblock 54).

In sub-step 116, storage application 44 sends the unique address for the newly-written data block 56, 57 to the application 42 which was responsible for writing that block 56, 57. In sub-step 117, which may be performed in parallel with sub-steps 115 and 116, storage application 44 stores, at an offset associated with the newly-written data block within the macroblock 54 in the backpointer map element 86 for the macroblock 54, a backpointer to the application 42 which was responsible for writing that block 56, 57, as described above.

In step 120, as the storage application 44 deletes or overwrites blocks 56, 57 on primary persistent storage 40, storage application 44 marks those blocks as deleted. In sub-step 121, storage application 44 (in some embodiments, through the action of garbage collection module 46) increments a counter of the blocks deleted element 74 for the respective segment 52 within metadata 50 within memory 38, as described above.

In sub-step 123, as each additional data block 56, 57 is deleted or rewritten from a macroblock 54 by storage application 44, storage application 44 updates the block-use map element 84 for that macroblock 54 within metadata 50 within memory 38 by marking that block 56, 57 as inactive, as described above.

In step 130, garbage collection module 46 computes a ratio 76 of storage marked as deleted as compared to storage written within a segment 52. Typically, this is done by dividing the counter of the blocks deleted element 74 by the counter of the blocks written element 72 for a given segment 52. However, in some embodiments, instead of using the numbers of blocks written and deleted, the numbers of bytes written and deleted or some other measures may be used.

In sub-step 131, it is indicated that step 130 is performed repeatedly for each segment 52 upon completing the ratio computation for all of the active segments 52. Alternatively, in sub-step 133, it is indicated that step 130 is performed for a given segment 52 after every n write and delete operations (combined) performed on that segment. For example, in one embodiment, n is equal to the maximum number of compressed blocks 57 allowed per segment (e.g., 63).

In some embodiments, garbage collection module 46 performs optional step 140, in which certain segments 52 with particularly high ratios 76 are prioritized for fragmenting garbage collection. Thus, either the ratios 76 are saved for each segment 52 within segment metadata 66 and compared or any segment 52 with a high enough ratio 76 (above a very high threshold) is prioritized.

In step 150, upon the calculated ratio 76 for a given segment 52 exceeding a threshold (and subject to any prioritization from step 140), garbage collection module 46 performs a garbage collection operation on the segment 52. This step may be accomplished through sub-steps 151-157.

In sub-step 151, garbage collection module 46 identifies macroblocks 54 within the segment 52 (on which defragmentation is being performed) that contain at least one block 56, 57 marked as deleted. This may be accomplished by counting the number of zero entries within the block use map element 84 for each macroblock 54 of the segment 52 under consideration. In the case of a macroblock 54 containing uncompressed blocks 56, only the first few entries of the block use map element 84 (corresponding to the fixed number of uncompressed blocks 56 that fit within a macroblock 54) are considered in this count. In the case of a macroblock 54 containing compressed blocks 57, only the entries of the block use map element 84 for which a block size has been defined are considered in this count. However, in some embodiments, all macroblocks 54 containing compressed blocks 57 are identified by sub-step 151, allowing the constituent compressed blocks 57 to be repacked most efficiently.

In sub-step 153, garbage collection module 46 copies active data blocks 88, 92 which have not been marked as deleted within the macroblocks 54 identified in sub-step 151 to a new macroblock 54 allocated from the pool of free macroblocks 60. This is repeated until all active data blocks 88, 92 which have not been marked as deleted within the macroblocks 54 identified in sub-step 151 have been copied to one or more new macroblocks 54.

In sub-step 155, upon copying the active data blocks in sub-step 153, the backpointer map elements 86 for the new macroblocks 54 must be created. Thus, a new respective unique address is assigned to the copied active data blocks 88, 92 based on their new respective locations, the new unique address is sent to the respective application 42 responsible for writing each copied active data block 88, 92, and the backpointer to the respective application 42 is saved to the appropriate offset within the backpointer map element 86 of the new macroblock 54.

In sub-step 157, the macroblocks 54 which were identified in sub-step 151 may be freed to the pool of free macroblocks 60, since the remaining active data blocks 88, 92 therein have now been moved to a new macroblock 54.

Finally (not depicted), the macroblock map element 70 for the segment 52 being compacted is updated to reflect the new macroblocks 54 therein.

Thus, techniques have been described for defragmenting garbage collection in a DSS 32. This is accomplished by organizing macroblocks 54 into larger segments 52, maintaining metadata 50 about writes 72 and deletions 74 performed on each segment 52, and performing a data compaction feature (step 150) on macroblocks 54 of a segment 52 when its metadata 50 indicates that it is highly fragmented.

3. Metadata Structures

Other embodiments are directed to improved techniques of managing storage in a data storage system involving compressing a subset of block and macroblock metadata. Advantageously, a data storage system operating according to the improved techniques is able to store more metadata in volatile memory even for huge data objects.

Figure 4:
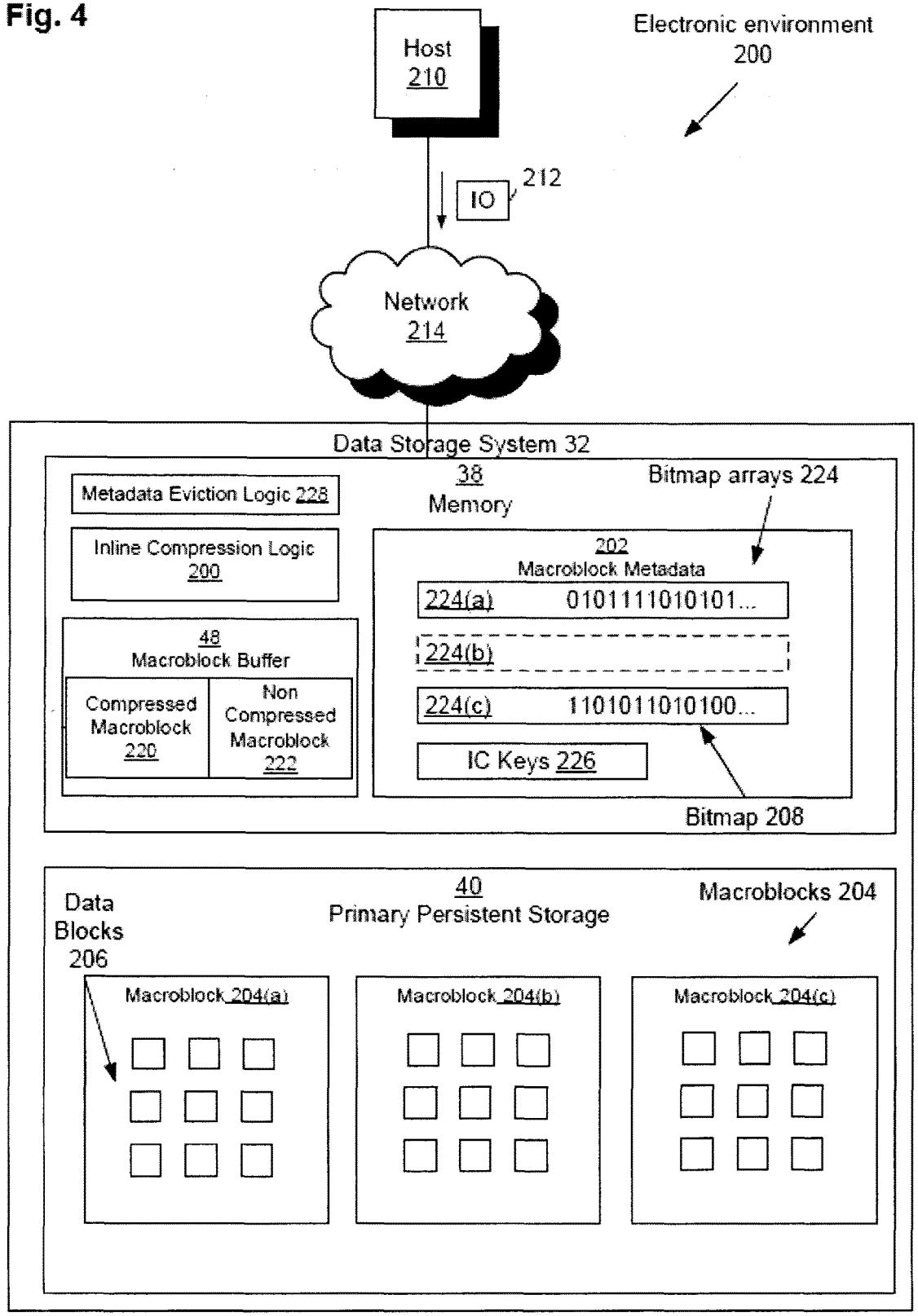
FIG. 4 depicts the example data storage system shown in FIG. 1 according to other embodiments.

FIG. 4 illustrates an example electronic environment 200 for carrying out the above-described improved techniques of managing storage in a data storage system. Electronic environment 200 includes data storage system 32, host computing device 210, and network 214. Here, the host computing device ("host") 210 accesses data storage system 32 over network 214. The data storage system 32 includes the processor 36 and non-volatile storage in the form of a primary persistent storage 40 (see FIG. 1). The storage 40 is provided, for example, in the form of hard disk drives and/or electronic flash drives.

The network 214 can be any type of network or combination of networks, such as a storage area network (SAN), local area network (LAN), wide area network (WAN), the Internet, and/or some other type of network, for example. In an example, the host 210 can connect to the processor 36 using various technologies, such as Fibre Channel (e.g., through a SAN), iSCSI, NFS, SMB 3.0, and CIFS. Any number of hosts 110 may be provided, using any of the above protocols, some subset thereof, or other protocols besides those shown. The processor 36 is configured to receive IO request 212 and to respond to such IO requests 212 by reading from and/or writing to the persistent storage 40 and sending an acknowledgment.

Data storage system 32, as discussed above, includes a primary persistent storage 40 and memory 38; memory 38 includes macroblock buffer 48. As shown in FIG. 4, primary persistent storage 40 stores data blocks 206 in macroblocks such as macroblock 204(*a*), macroblock 204(*b*), macroblock 204(*c*), and so on. Each such macroblock 204 contains a fixed amount of data (e.g., 1 MB, 2 MB, 512 kB, etc.) and represents a contiguous address space in storage. Each macroblock 204 holds either all compressed data blocks 57 or uncompressed data blocks 56. Those macroblocks 204 containing only compressed data blocks include headers 58 (see FIGS. 1 and 2) that provide a map of compressed data block size vs position within those macroblocks 204.

Memory 38, in addition to what was described in connection with FIG. 1, includes an inline compression logic module 200, metadata eviction logic module 228, macroblock metadata 202.

Inline compression logic module 200 in memory 38 is configured to cause processor 36 to perform inline compression operations on data blocks contained in input/output (IO) request 112 and macroblock metadata 202 (see metadata 78 in FIG. 1) and determine whether each of these data objects are compressible. For example, if after an inline compression operation, a data object is larger than some threshold size, inline compression logic module 200 causes processor 36 to determine that data object to be incompressible and act on that data object accordingly. Compression may be accomplished using an LZW algorithm, although other compression algorithms may be used.

Metadata eviction logic 228 is configured to cause processor 36 to perform an eviction operation on macroblock metadata 202 to keep the size of macroblock metadata 202 in memory below some maximum. For example, metadata eviction logic 228 may cause processor 36 to evict a bitmap array 224 that satisfies specified criteria. Eviction of a bitmap array 224 may involve writing bitmap array 224 in a macroblock 204 in primary persistent storage 40 and generating a single value that tracks the location in storage 40. In some arrangements, processor 36 may perform an inline compression operation on bitmap array 224 prior to storage in a macroblock 204.

As described in FIG. 1 above, each macroblock 204 has associated macroblock metadata stored in memory 38. As illustrated in FIG. 4, block and macroblock metadata 202 is arranged as structures including bitmap arrays 224 and IC keys 226. (See elements 82 and 84 of macroblock metadata 78 in connection with FIG. 1.) Bitmap arrays 224 each have arrays of bitmaps 208, each bitmap 208 having, e.g., 64 bits, 128 bits, etc, representing block data behavior in a respective macroblock 204. In some arrangements, the arrays of bitmaps 208 in an array 224 are arranged sequentially with respect to offset in storage 40. The first bit of a bitmap 208 indicates whether the respective macroblock 204 contains compressed or uncompressed data blocks. The other bits of bitmap represent whether the data blocks 206 in that macroblock 204 are in use. For example, in a macroblock containing 30 compressed data blocks, the last 33 bits of associated bitmap 208 would indicate compressed data blocks not in use. Other bits of the first 30 bits may also indicate compressed blocks not in use; this may happen when such blocks are deallocated because of deduplication, for example.

IC keys 226 are each bitmaps of a fixed size, e.g., 64 bits. Each IC key 226 represents a location within a particular macroblock of a given data block. For example, in a macroblock 204 containing 63 compressed data blocks, the last six bits of an IC key 224 represent the position of a data block 206 within the macroblock 204, while the first 57 bits represent a location (i.e., offset) of the macroblock 204 in primary persistent storage 40.

Macroblock buffer 48, as described above, provides temporary storage of macroblocks 204 in memory 38. For example, after performing a compression operation on a data block 206 to be written to primary persistent storage 40, processor 36 places the data block 206 into either macroblock 220 or 222 in macroblock buffer 48 according to whether the data block 206 could be compressed. At some point, e.g., when macroblock 220 or 222 in buffer 48 is filled or has been stored in buffer 48 after a long enough period of time, processor 36 evicts macroblock 220 or 222 from buffer 48, i.e., writes its data blocks 206 to primary persistent storage 40 and generates respective bitmaps 208 and IC keys 224.

During an example operation, host 210 sends an IO request 212 over network 214 containing a request to write a data block 206 to primary persistent storage 40. Upon receipt of data block 206 over network 214, processor 36 performs an inline compression operation on data block 206 according to instructions contained in inline compression logic 200. If processor 36 determines data block 206 to be incompressible, then processor 36 places uncompressed data block in macroblock 222 that contains only uncompressed data blocks. If on the other hand processor 36 determines data block 206 to be compressible, then processor 36 places compressed data block in macroblock 220 that contains only compressed data.

Upon completion of the storage of data blocks in either macroblock 220 or 222, processor 36 generates a respective bitmap 208 and places bitmap 208 in a bitmap array 224. When processor 36 writes macroblock 220 or 222 to primary persistent storage 40, processor 36 generates an IC key 226 for each data block stored in that macroblock.

At some point, processor 36 performs an eviction operation on macroblock metadata 202 to evict bitmap array 224(b) from memory 38. Processor 36 performs a compression operation on bitmap array 224(b) and writes bitmap array in either macroblock 220 or 222 according to whether bitmap array 224(b) is compressible. Upon writing to primary persistent storage 40 the macroblock in which bitmap array 224(b) is stored, processor 36 stores an indicator called a logical block number to macroblock metadata 202 so that bitmap array 224(b) may be recovered if needed later.

Figure 5:
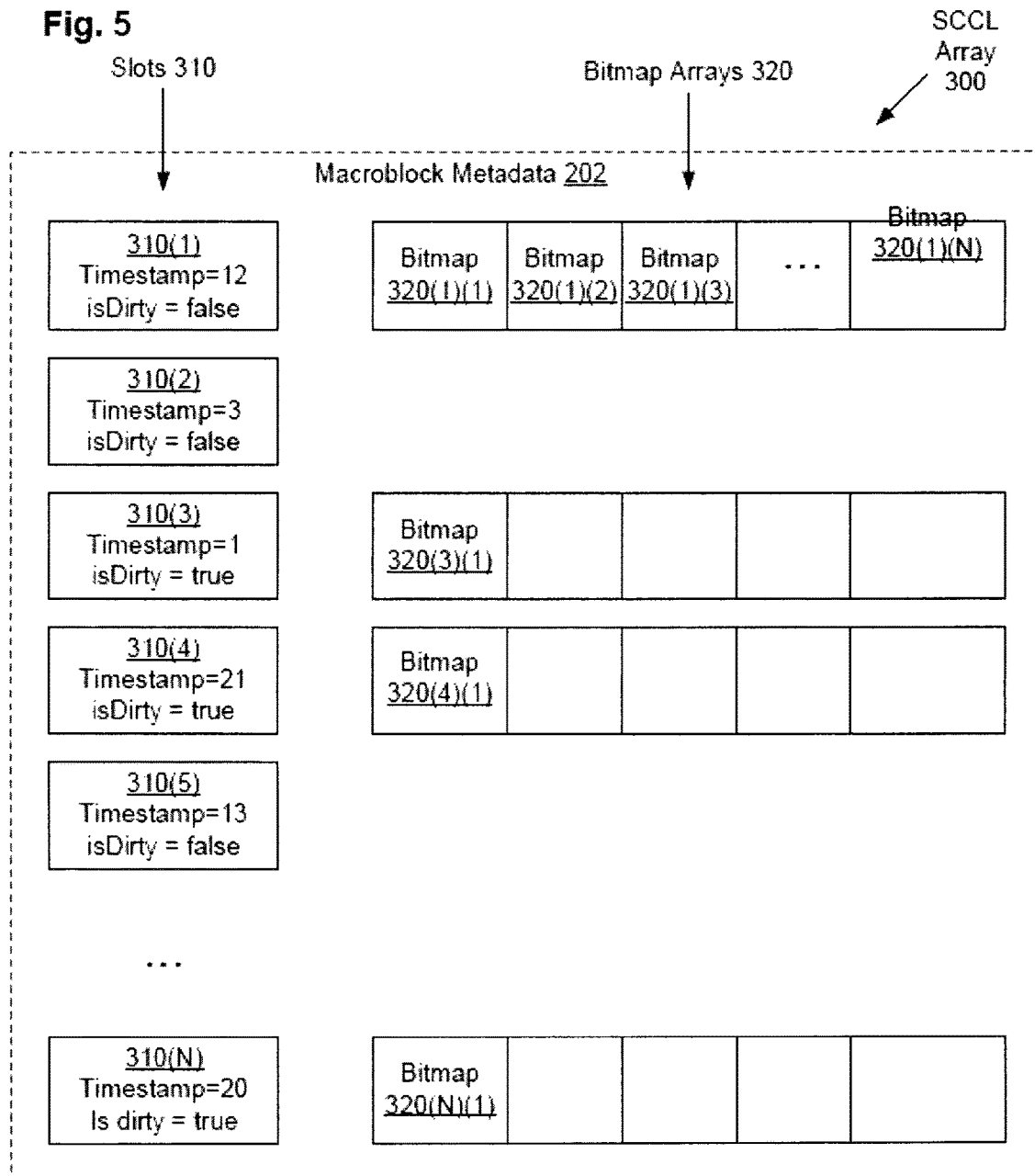
FIG. 5 depicts an example macroblock metadata structure within the data storage system shown in FIG. 4 according to various embodiments.

FIG. 5 provides further detail of the eviction operation. Specifically, FIG. 5 illustrates a specific data structure called a sparse compressed cache-like (SCCL) array 300 in which macroblock metadata such as bitmap arrays 320 are arranged. SCCL array 300 resides within macroblock metadata 202 within memory 38 and is called "cache-like" because of its property of evicting least-recently-used data from memory 38.

SCCL array 300 includes slots 310(1), 310(2), . . . , 310(N), where N is the number of slots 310 in SCCL array 300. Each slot 310 contains a pointer to a respective bitmap array 320, whether the respective bitmap array 320 is currently present in memory 38 or evicted and written to primary persistent storage 40. For example, if the bitmap array 320(2) to which respective slot 310(2) points has been evicted from memory 38, then slot 310(2) has a pointer value of NULL. Otherwise, if the bitmap array 310(1) to which respective slot 310(1) points is currently resident in memory 38, then slot 310(1) has a pointer value reflecting an address in memory at which bitmap array 320(1) resides.

To determine the conditions under which processor 36 evicts bitmap arrays 320 from memory 38, slots 310 and SCCL array 300 each contain attributes whose values determine those conditions. For example, metadata eviction logic 228 (FIG. 4) might impose a condition that the least-recently-used bitmap array 320 having dirty data, i.e., data that is not written to primary persistent storage 40, is to be evicted.

To effect the evaluation of whether such a condition is met, slots 310 each contain a timestamp attribute and an isDirty attribute. The timestamp attribute of a slot 310 is a number indicating a time at which the most recent access to the respective bitmap array 320 to which slot 310 points. In some arrangements, such a time is simply a long integer and reflects a place in a sequence of bitmap array accesses throughout SCCL array 300. In this case, SCCL array 300 has a global timestamp attribute that increments each time a bitmap array within the SCCL array is accessed. For example, suppose that the global timestamp is initially zero upon creation of SCCL array 300. Upon an access of a bitmap array 320(3), processor 36 increments the global timestamp by 1 so the value of the global timestamp is 1. Processor 36 then assigns the timestamp attribute of slot 310(3) the value of the global timestamp, or 1. Upon subsequent access of a bitmap array 320(1), processor 36 increments the global timestamp by 1 so the value of the global timestamp is 2. Processor 36 then assigns the timestamp attribute of slot 310(1) the value of the global timestamp, or 2. In this way, processor 36 may identify the least-recently-used bitmap array using a small amount of memory.

The isDirty attribute of a slot 310 may be a Boolean value that indicates whether the bitmap array 320 to which the slot points has dirty data, i.e., data that is not written to primary persistent storage 40. For example, when processor 36 creates a new bitmap array 320 and stores it in SCCL array 300 at slot 310, processor 36 assigns the isDirty attribute of that slot to TRUE because data in new bitmap array 320 has not yet been written to primary persistent storage 40. The isDirty attribute of a slot may be set to FALSE when, for example, it points to a bitmap array 320 that has been recovered from primary persistent storage 40 but has not yet been changed.

The slots 310 have one more attribute that is used to recover bitmap arrays from primary persistent storage 40, a logical block number (LBN). When processor 36 evicts a bitmap array from memory 38, Processor 36 generates a LBN that indicates the macroblock in which the bitmap array is stored. Processor 36 then uses the LBN to locate the evicted bitmap array for recovery.

FIG. 6 illustrates an example process 400 by which bitmap arrays 320 of SCCL array 300 are compressed and decompressed. At 402, processor 36 evicts bitmap array 320 from SCCL array 300 to effect compression of the SCCL array 300. At 404, processor 36 recovers the bitmap array from the primary persistent storage 40. Details of each of these actions are as follows.

To effect compression, at 406 processor 36 locates the slot 310 having the least-recently-used bitmap array 320 having dirty data. For example, each occurrence of a change in the value of the global timestamp of the SCCL array 300, processor 36 performs a comparison operation to locate the slot having the smallest value of its timestamp attribute that has the value of its isDirty attribute set to TRUE.

At 408, processor 36 writes to primary persistent storage 40 the bitmaps of the bitmap array 320 pointed to by the slot 310 having the smallest value of its timestamp attribute that has the value of its isDirty attribute set to TRUE. For example, processor 36 locates a macroblock 204 having available space for bitmap array 320. In some arrangements, prior to writing to primary persistent storage 40, processor 36 performs a compression operation on the bitmaps of the bitmap array within macroblock buffer 48.

At 410, processor 36 generates a LBN based on the macroblock 204 in which the bitmaps of bitmap array 320 is stored. For example, the LBN is a 64-bit integer that reflects a unique identifier of macroblock 204 into which the bitmaps are written.

At 412, processor 36 returns the generated LBN to the located slot as the value of an LBN attribute of that slot. At this point, the pointer to the bitmap array 320 pointed of the located slot is set to NULL. In this way, processor 36 has compressed SCCL array 300 by making the space formerly occupied by bitmap array 320 available as a buffer.

To effect decompression of SCCL array 300 by recovering the bitmap array written to primary persistent storage 40, at 414, processor 36 locates the slot 310 that would have pointed to bitmap array 320 had it not been evicted. For example, such a slot 310 may be identified based on attributes of the slot such as the timestamp. At 416, processor 36 reads the value of the LBN attribute of that slot 310. At 418, processor 36 locates the macroblock in which bitmap array 320 is stored using the value of the LBN attribute read from slot 310. In some arrangements in which bitmap array 320 had been compressed, at 420, processor 36 decompresses the bitmap array.

It should be understood that the slot 310 that would have pointed to bitmap array 320 had it not been evicted might currently point to another bitmap array. In this case, processor 36 may create a new slot and location in memory 38 for the recovered bitmap array 320.

It should also be understood that the improved techniques may be applied in cases of write splits in the presence of shared data blocks. For example, a file system that supports deduplication may share a data block referenced by a file. In many cases, the file system supports backpointers to which the indirect blocks of the file may point in order to simplify the task of locating shared blocks. When a file pointing to a shared block via a backpointer receives a request to overwrite the shared block, the file system causes a processor to copy the data stored in the shared block to a new location and update the backpointer to point to the new location.

Figure 7:
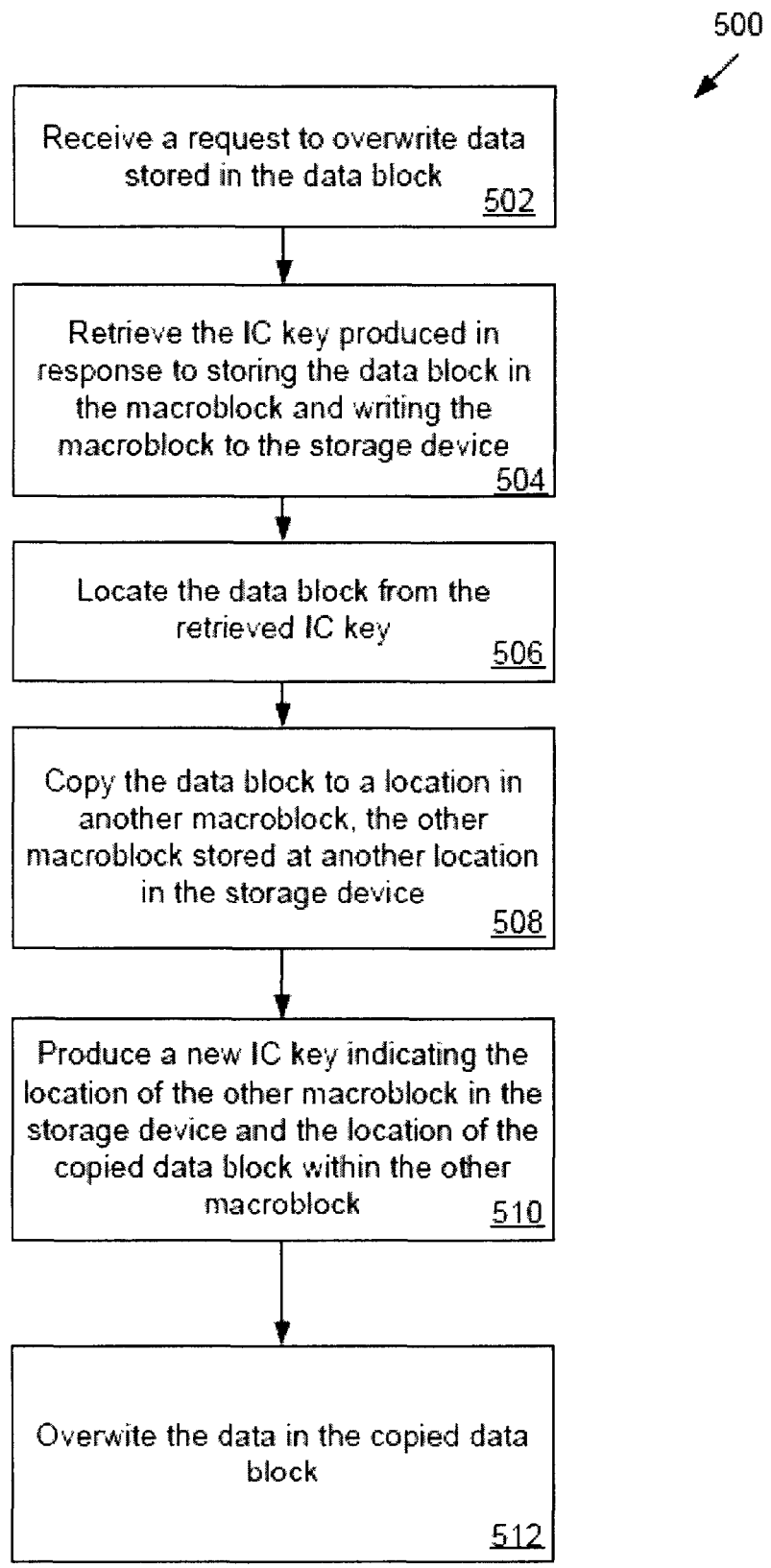
FIG. 7 depicts an example process of overwriting data according to various embodiments.

FIG. 7 illustrates an example process 500 of performing a write split of a data block using the IC key 226. At 502, processor 36 receives a request to overwrite data stored in a data block within a macroblock 204. At 504, processor 36 retrieves the IC key 226 that provides the location of the data block in primary persistent storage 40, i.e, the macroblock 204 and position within the macroblock 204.

At 506, processor 36 locates the data block using the IC key. For example, the location within a macroblock 204 that holds only compressed data may be found from the last 6 bits of the IC key 226. When the data blocks 206 within macroblock 204 are compressed, however, processor 36 checks the macroblock header to find the precise location of the compressed data block within the macroblock 204.

At 508, processor 36 copies the data in the data block to another location in primary persistent storage 40. In the case that the data block was compressed, processor 36 decompresses the data block prior to copying.

At 510, processor 36 updates the value of the IC key to reflect the new location in disk of the data block.

At 512, processor 36 overwrites the data in the data block at the new location. In some arrangements, processor 36 performs a compression operation on the overwritten data and relocates the data to a compressed or uncompressed macroblock based on the compressibility of the overwritten data. In this case, the IC key is updated after overwriting as the position of the overwritten data block in primary persistent storage 40 is not clear until a compression operation has been performed on overwritten data.

Figure 8:
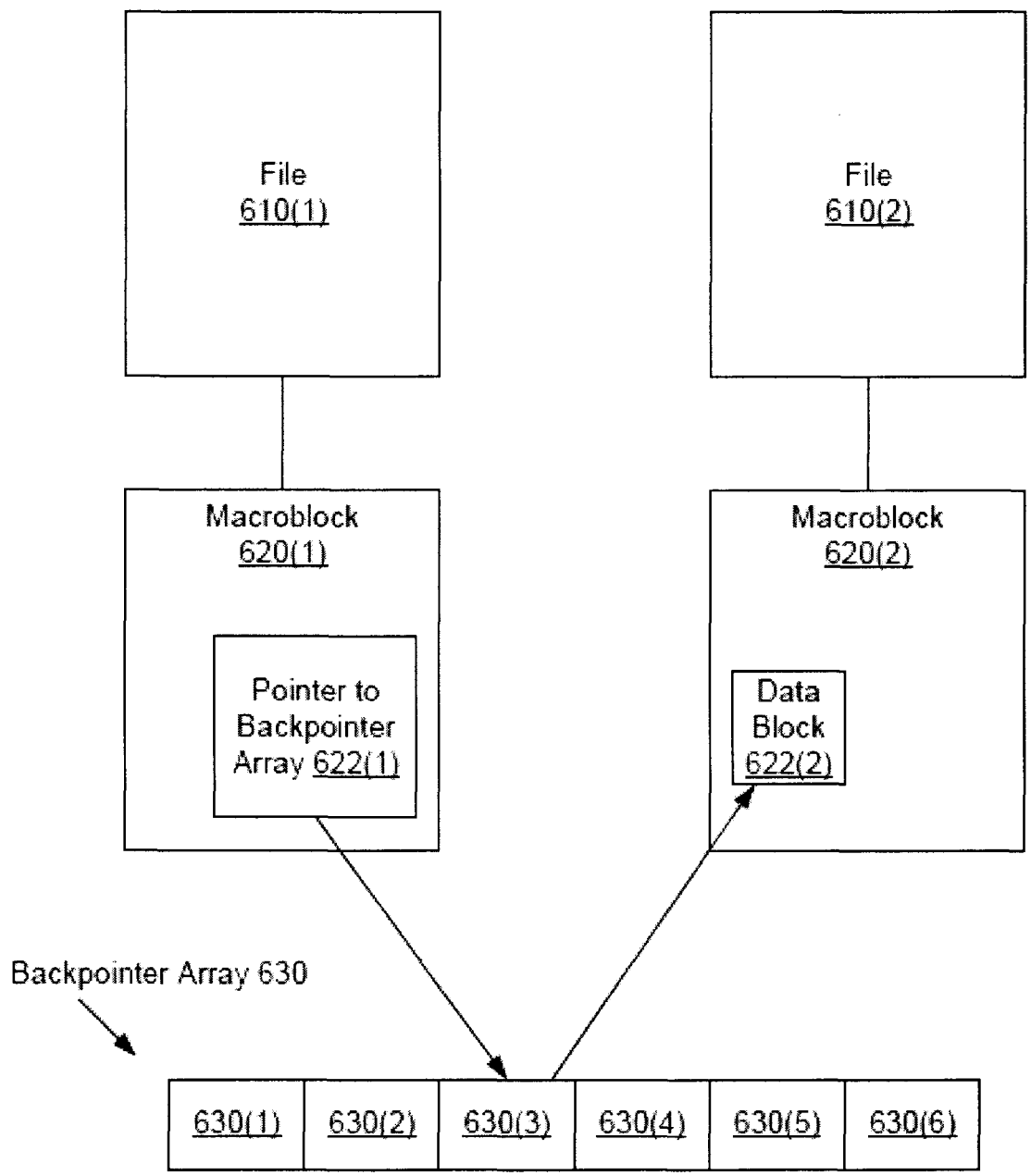
FIG. 8 depicts an example backpointer array according to various embodiments.

FIG. 8 illustrates an example backpointer array 630 used to locate shared data blocks. Backpointer array 630 is an array of fixed size that stores backpointers. Each backpointer of array 630 is pointed to by a block pointer stored in an indirect block, which in turn is pointed to by a block pointer of an mode of a file 610. In this case, an indirect block may point to an offset within backpointer array 630 as a way to point to a backpointer.

A backpointer of backpointer array 630 points to a data block pointed to by an indirect block of another file 620; such a pointing relationship may be, as described above, as result of a deduplication operation. Thus, any overwriting of the data block results in a write split as described in connection with FIG. 7.

In some arrangements, backpointers stored in backpointer array 630 may contain redundant information. For example, some backpointers in adjacent elements of backpointer array 630 may differ only in offset values. In this case, backpointer array 630 may be compressed in the same manner (e.g., LZW algorithm) as other block metadata described herein.

Figure 9:
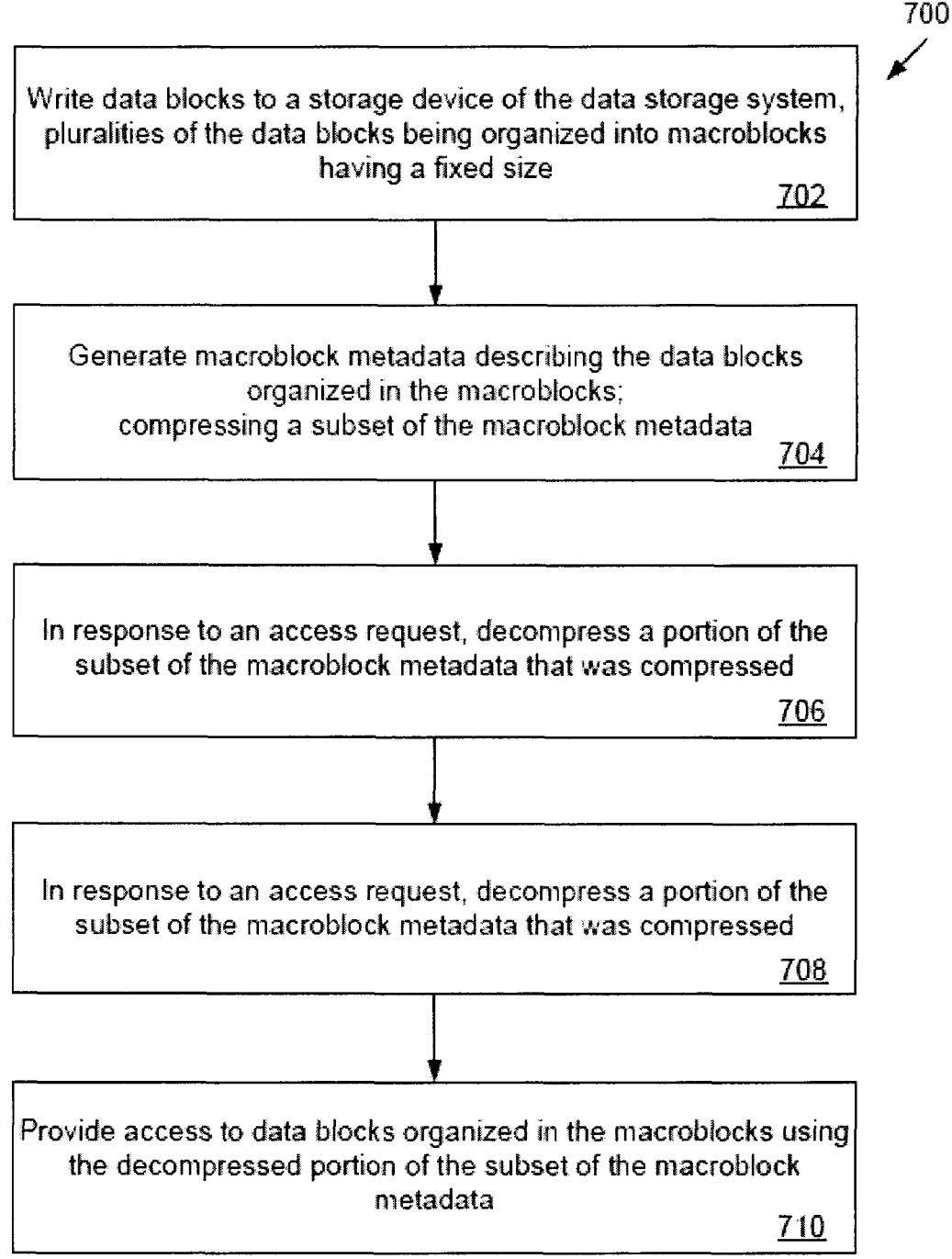
FIG. 9 depicts another example method according to various embodiments.

FIG. 9 illustrates an example method 700 of managing storage in a data storage system according to the improved techniques described herein. At 702, SP 28 writes data blocks to a storage device of the data storage system, pluralities of the data blocks being organized into macroblocks having a fixed size. At 704, processor 36 generates macroblock metadata describing the data blocks organized in the macroblocks. At 706, processor 36 compresses a subset of the macroblock metadata. At 708, processor 36, in response to an access request, decompressing a portion of the subset of the macroblock metadata that was compressed. At 710, processor 36 provides access to data blocks organized in the macroblocks using the decompressed portion of the subset of the macroblock metadata.

4. Macroblock Cache

Other alternative embodiments are directed to improved techniques of managing IO cache in a data storage system involving arranging cache into fixed size storage objects (e.g., cache macroblocks, also referred to herein as "macroblocks" when residing in cache) comprising multiple sub-storage objects (e.g., IO blocks) and selectively compressing the sub-storage objects. Advantageously, a data storage system operating according to the improved techniques is able to store more data in cache thereby improving overall system performance.

Figure 10:
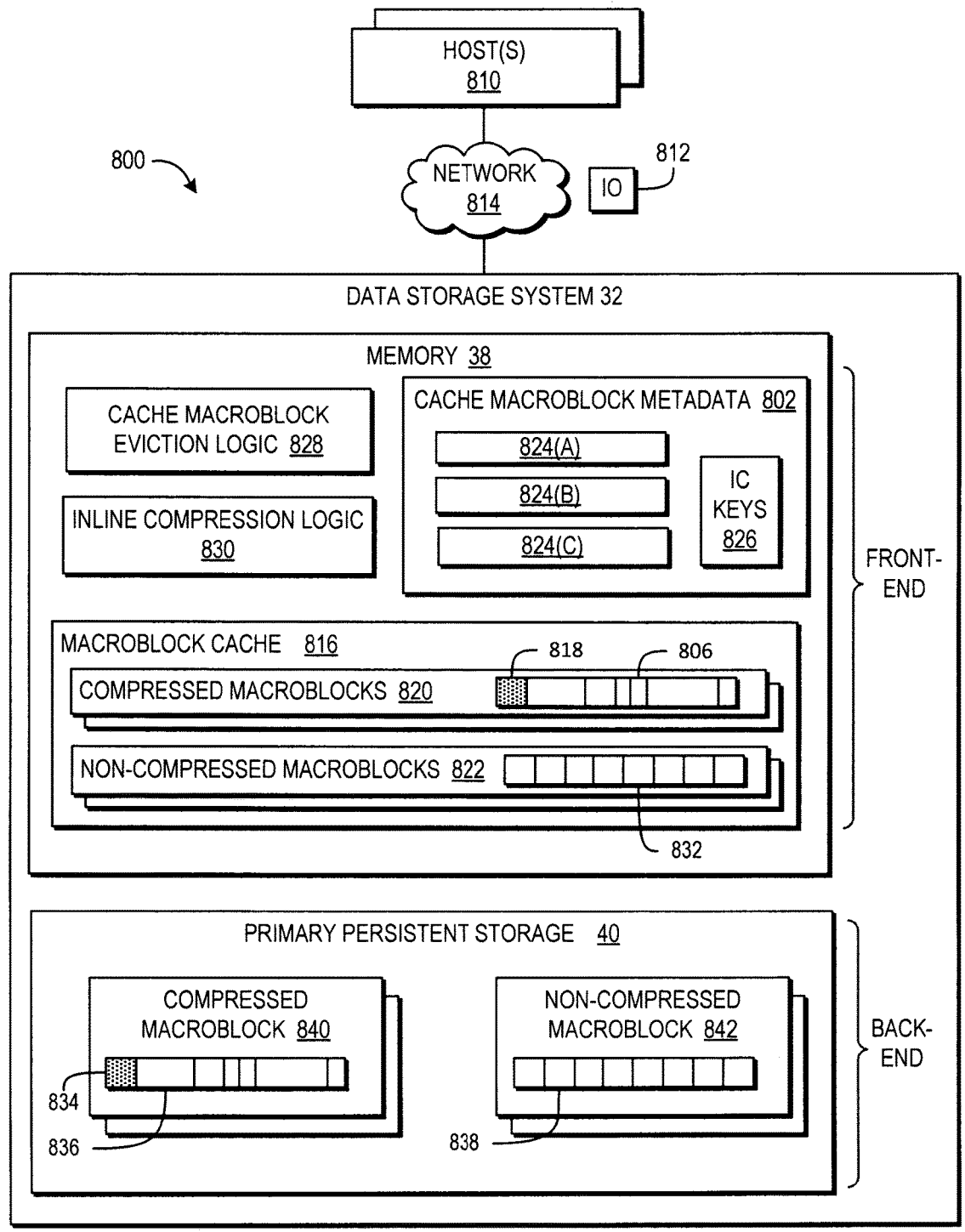
FIG. 10 depicts the example data storage system shown in FIG. 4 according to other alternative example embodiments.

FIG. 10 illustrates an example electronic environment 800 for carrying out the above-described improved techniques of managing IO cache in a data storage system. Electronic environment 800 includes data storage system 32, host computing device(s) 810, and network 814. Here, the host computing device ("host") 810 accesses data storage system 32 over network 814. The data storage system 32 includes a processor and non-volatile storage in the form of a primary persistent storage 40. The processor may be similar to the processor 36 described in FIGS. 1 and/or 4; however, other circuitry including one or more special purpose storage processors and memory may be used in the alternative or in addition. The primary persistent storage 40 is provided, for example, in the form of hard disk drives and/or electronic flash drives located in the 'backend' of the data storage system 32.

The network 814 can be any type of network or combination of networks, such as a storage area network (SAN), local area network (LAN), wide area network (WAN), the Internet, and/or some other type of network, for example. In an example, the host 810 can connect to the storage processor using various technologies, such as Fibre Channel (e.g., through a SAN), iSCSI, NFS, SMB 3.0, and CIFS. Any number of hosts 810 may be provided, using any of the above protocols, some subset thereof, or other protocols besides those shown. The processor 36 is configured to receive IO request 812 and to respond to such IO requests 812 by reading from and/or writing to the persistent storage 40 and sending an acknowledgment.

Data storage system 32 includes frontend volatile cache memory 38 and non-volatile backend primary persistent storage 40. Memory 38, in addition to what was described above in connection with FIGS. 1 and 4, includes an inline compression/decompression logic module 830 (compression/decompression may also be referred to herein as simply compression), cache macroblock eviction logic module 828, cache macroblock metadata 802 and macroblock cache 816.

Macroblock cache 816 includes portions of cache arranged to store compressed IO cache macroblocks 820 and non-compressed IO cache macroblocks 822. Each such macroblock represents a contiguous address space in storage and holds either all compressed or uncompressed storage objects such as IO data blocks. It should be noted that IO data blocks are used for discussion purposes in relation to storage objects; however, the techniques described herein should not be construed as being limited thereto and other storage objects (e.g., pages, files, CAS, bytes, etc.) may be similarly employed. The non-compressed macroblocks 822 are equal size, fixed-length storage units and are configured to store fixed size IO blocks 832 (e.g., 8K blocks of IO data). The compressed macroblocks 820 are also equal size, fixed-length storage units and are configured to store variable size compressed IO blocks 806.

Compressed macroblocks 820 further include cache macroblock header data 818. Cache macroblock header data 818 includes one or more fields that describe cache macroblock characteristics. One field includes block size information for each variable sized compressed IO block 806 indicating where a particular compressed IO block 806 is located within its corresponding compressed cache macroblock 820. The block size stores the number of bytes a compressed IO block 806 occupies in its compressed macroblock 820. Compressed IO block size in the macroblock header 818 does not change, thus, accumulating the size of previous blocks for any IO block in a cache macroblock will give the block offset. A version field may be provided to differentiate structure and content of the macroblock header 818 to allow for future system design modifications and enhancements. A compression algorithm tag for each block may be included to provide a mechanism to compress various blocks using various different algorithms. Alternatively, or in addition, the compression algorithm tag may be used to set the compression algorithm to be the same for all blocks in a cache macroblock.

Primary persistent storage 40 is arranged and structured in a similar manner to store compressed and non-compressed macroblocks 840, 842. Non-compressed persistent macroblocks 842 are equal size, fixed-length storage units and are configured to store fixed size IO blocks 838. Compressed persistent macroblocks 840 are also equal size, fixed-length storage units and are configured to store variable size compressed IO blocks 836. Compressed persistent macroblocks 840 similarly include macroblock header data 834 comprising one or more fields that describe persistent macroblock characteristics. One field includes block size information for each variable sized compressed IO block 836 indicating where a particular compressed IO block 836 is located within its corresponding compressed persistent macroblock 840. The block size stores the number of bytes a compressed IO block 836 occupies in its compressed macroblock 840. Compressed IO block size in the macroblock header 834 does not change, thus, accumulating the size of previous blocks for any IO block in a persistent macroblock will give the block offset. A version field may be provided to differentiate structure and content of the macroblock header 834 to allow for future system design modifications and enhancements. A compression algorithm tag for each block may be included to provide a mechanism to compress various blocks using various different algorithms. Alternatively, or in addition, the compression algorithm tag may be used to set the compression algorithm to be the same for all blocks in a persistent macroblock.

In alternative example embodiments, one or more different macroblock lengths may vary in a number of different ways. For instance, compressed cache macroblocks 820 can have a length equal to the length of the non-compressed cache macroblocks 822. Similarly, compressed persistent macroblocks 840 can have a length equal to the length of the non-compressed persistent macroblocks 842. However, in alternative embodiments, compressed cache macroblocks 820 may have a different length than non-compressed cache macroblocks 822 and compressed persistent macroblocks 840 may have a different length than non-compressed persistent macroblocks 842. Further, compressed cache macroblocks 820 may vary in length from one another and/or non-compressed cache macroblock 822 may vary in length from one another. Compressed persistent macroblocks 840 may vary in length from one another and/or non-compressed persistent macroblock 842 may vary in length from one another.

Inline compression logic module 830 is configured to cause processor 36 to perform inline compression operations on data blocks or objects contained in IO request 112 and determine whether the IO data blocks are compressible. For example, if the size of an IO data block after an inline compression operation is smaller than some threshold size, inline compression logic module 830 causes processor 36 to determine that IO data block is to be compressed, acts on that IO data block accordingly, and stores the compressed IO block in a compressed cache macroblock 820. However, if the IO data block is larger than some threshold size, inline compression logic module 830 causes processor 36 to determine that the IO data block is uncompressible, acts on that data block accordingly, and stores the IO data block in a non-compressed cache macroblock 822. Compression may be accomplished using an LZ algorithm, although other compression algorithms may be used.

Cache macroblock eviction logic 828 is configured to cause processor 36 to perform an eviction operation on one or more IO cache macroblocks 820, 822 to keep the number of IO macroblocks stored in macroblock cache 816 at or below some maximum. For example, in the event all IO cache macroblocks are used, cache macroblock eviction logic 828 may cause processor 36 to evict an IO cache macroblock with a relative low access rate to make room for new or more recently accessed IO data blocks in space formerly occupied by the evicted macroblock. For example, IO counter and timestamp or similar information stored in cache macroblock metadata 802 can be used to target one or more least-recently-used cache macroblocks for eviction. Eviction of an IO cache macroblock 820, 822 may involve writing the one or more macroblocks 820, 822 in macroblock cache 816 to a corresponding macroblock 804 in primary persistent storage 40 and generating a single value that tracks the location of the macroblock in backend storage 40. In some arrangements, processor 36 may maintain the current form of the macroblock being evicted, that is, IO data blocks in a compressed IO cache macroblock 820 may maintain its compressed format when written to a corresponding backend compressed macroblock 804. Similarly, IO data blocks in non-compressed IO cache macroblock 822 may be written in non-compressed format when written to a corresponding backend non-compressed macroblock 804.

Cache macroblock metadata 802 stores metadata for compressed and non-compressed macroblocks 820, 822 stored in macroblock cache 816. Cache macroblock metadata 802 is arranged as structures including bitmap arrays (including macroblock size information) 824 and IC keys 826. (Similar to elements 82 and 84 of macroblock metadata 78 described above in conjunction with FIG. 1.) Bitmap arrays 824 each have arrays of bitmaps, each bitmap having, e.g., 64 bits, 128 bits, etc., representing block data behavior in a respective cache macroblock 820, 822. In some arrangements, the arrays of bitmaps in an array 824 are arranged sequentially with respect to offset in storage 40. The first bit of a bitmap indicates whether the respective cache macroblock 820, 822 contains compressed or uncompressed data blocks. The next group of bits in a bitmap represent whether the data blocks 806 in that macroblock 820, 822 are in use. For example, in a macroblock 820 containing 30 compressed data blocks 806, the first 30 bits of the group indicate a block in use and the next 33 bits indicate the remaining compressed data blocks are not in use. Other bits of the first 30 bits may also indicate compressed blocks not in use; this may happen when such blocks are deleted or overwritten, for example.

The remaining groups of bits in the array 824 may be used to determine data activity for the associated cache macroblock 820, 822. For example, a group of bits is used to store an IO counter for each cache macroblock 820, 822. This counter is incremented for each read/write request from/to the cached macroblock. These counters can be used to decide which cache macroblock to evict from cache if a read/write request cannot be satisfied with current cache content. In one embodiment, the IO counter may be a single 64-bit unsigned integer and bit operations (e.g., ioCounter+=(1<<48)) are used to mark a cache macroblock for eventual eviction to backend persistent storage. In some embodiments, read increments are masked to avoid read counter overflow to avoid marking read-heavy cache macroblocks for eviction. The next group of bits is used to record timestamp information for IO request for each cache macroblock. For example, a timestamp for a first IO request and a timestamp for the last IO access for a cache macroblock is recorded. These timestamps and the IO counters are used to decide which cache macroblock 820, 822 to evict from macroblock cache 816 in the event an IO block read/write operation cannot be satisfied with the current cache content. In this way, the cache macroblock with the lowest IOPS (IO operations per second) can be identified and selected for eviction to backend storage.

Alternative example embodiments may be implemented using cache macroblock metadata bitmaps that vary in length. A number of bits may be used to track the macroblock size. For example, metadata for compressed and/or non-compressed macroblocks may use 3 bits to specify macroblock size. Thus, if these 3 size bits have a value of 0 then the macroblock size is 64 KB, if the 3 size bits have a value of 1 then the macroblock size is 128 KB, if the 3 size bits have a value of 2 then macroblock size is 256 KB, if 3 bits have a value of 3 then macroblock size is 512 KB, if 3 bits have a value of 4 then macroblock size is 1 MB, and so on. These extra 3 size bits may be stored in persistent metadata by copying the values to non-volatile memory (e.g., HDD) so that they may be restored after storage failure and restart.

IC keys 826 are each bitmaps of a fixed size, e.g., 64 bits. Each IC key 826 represents a location within a particular macroblock for a given data block. For example, in a macroblock 820 containing 63 compressed data blocks 806, the last six bits of an IC key 826 represent the position of a data block 806 within the macroblock 820, while the first 57 bits represent a location (i.e., offset) of the macroblock 820 in macroblock cache 816. Similarly, and as was described elsewhere herein, bitmap arrays 824 and IC keys 826 and are also maintained for blocks 808 and macroblocks 804 stored on backend storage 40 and operate in a similar manner.

During an example write operation, host 810 sends a write request 812 over network 814 containing a request to write a data block to memory 38. Upon receipt of data block over network 814, processor 36 performs an inline compression operation on the data block according to instructions contained in inline compression logic 830. If processor 36 determines the data block to be non-compressible, the processor 36 writes the data block to a block in a non-compressed cache macroblock 822. If on the other hand processor 36 determines data block 806 to be compressible, the block is compressed and then the processor 36 places the compressed data block in a compressed cache macroblock 820.

Upon completion of storage of data blocks in either macroblock 820 or 822, processor 36 generates a respective bitmap and places the bitmap in a bitmap array 824. In addition, the processor 36 generates an IC key 826 for each data block stored in that macroblock 820, 822.

During an example read operation, host 810 sends a read request 812 over network 814 containing a request to read a data block stored on data storage system 32. Upon receipt of read request 812, processor 36 analyzed macroblock metadata 802 to determine if the data is stored in macroblock cache 816, and if so, returns the requested data, decompressing if necessary. If the data is stored in a macroblock 804 on backend storage 40, the processor 36 retrieves the data from its corresponding macroblock 804 and writes it to an appropriate macroblock 820, 822 in macroblock cache 816, evicting a macroblock if necessary. The processor then retrieves the data from macroblock cache 816, decompressing if necessary, and returns the data to the host 810 via network 814.

Figure 11:
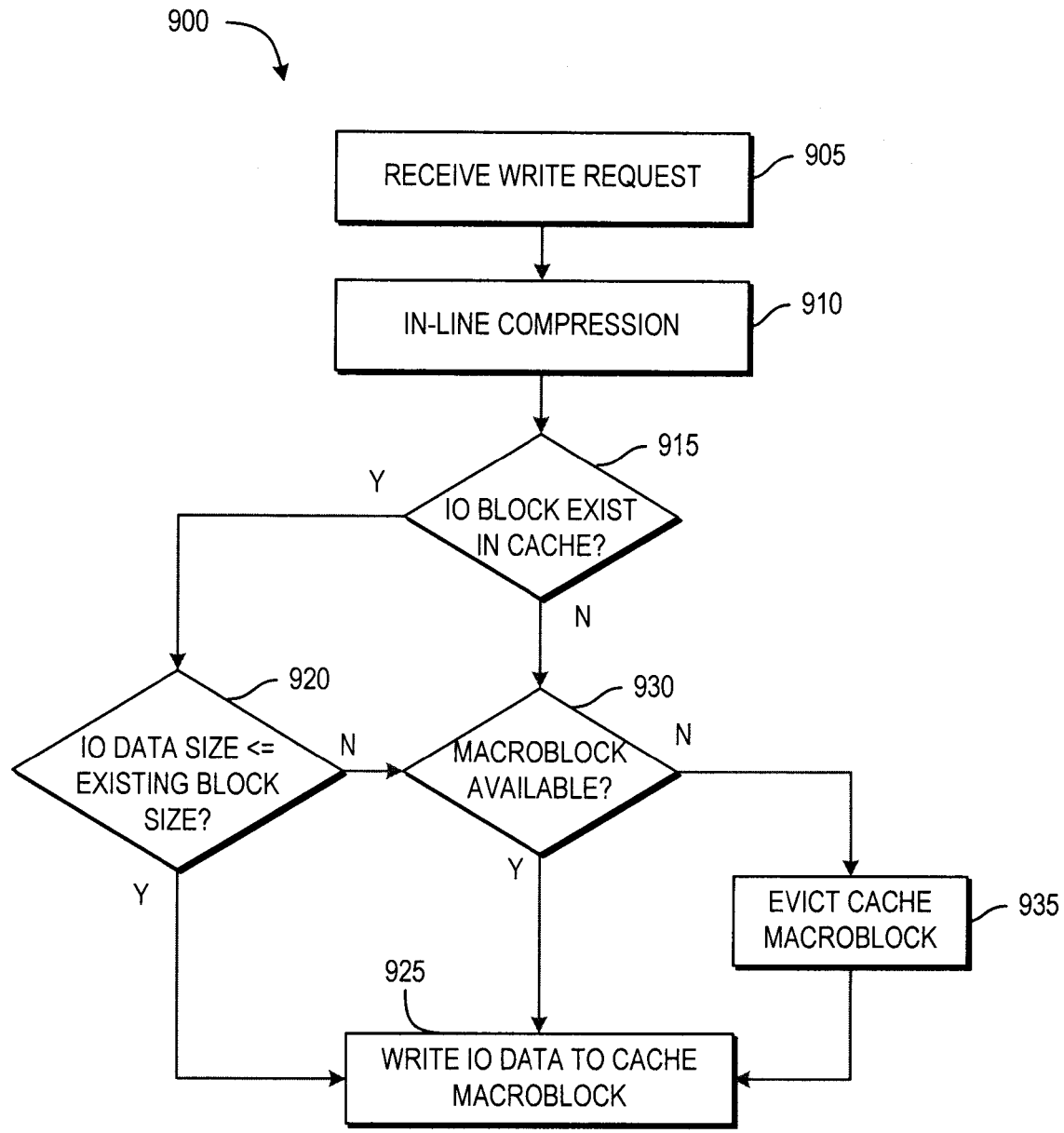
FIGS. 11-12 depicts flow diagrams illustrating methods according to various alternative example embodiments.
Figure 12:
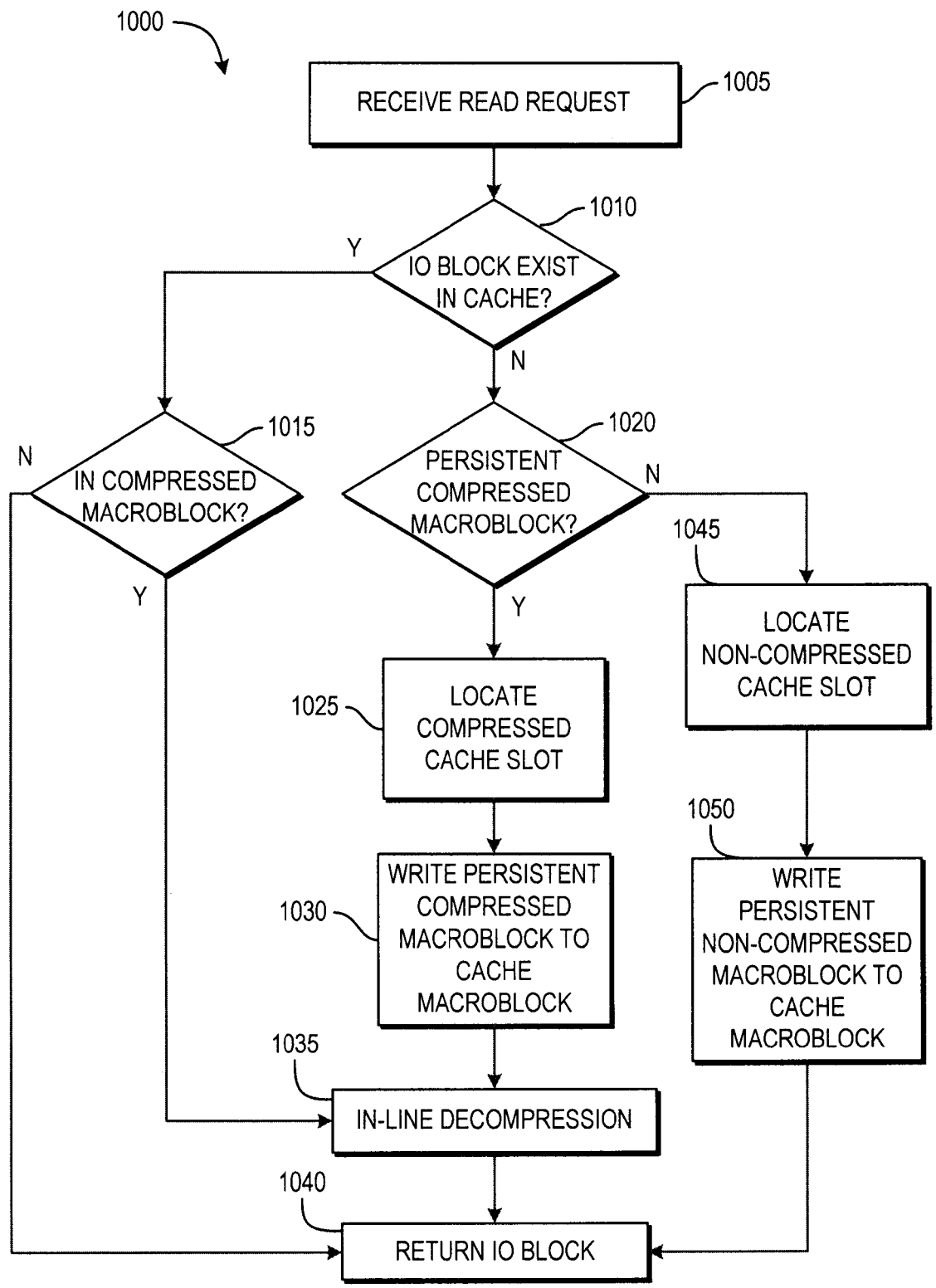

FIGS. 11 and 12 are flow diagrams that illustrate an example method for managing data storage IO cache in data storage systems similar to that shown in FIG. 10. While various methods disclosed herein are shown in relation to a flowchart or flowcharts, it should be noted that any ordering of method steps implied by such flowcharts or the description thereof is not to be construed as limiting the method to performing the steps in that order. Rather, the various steps of each of the methods disclosed herein can be performed in any of a variety of sequences. In addition, as the illustrated flowcharts are merely example embodiments, various other methods that include additional steps or include fewer steps than illustrated are also within the scope of the present invention.

As shown, the method 900 can be initiated automatically by storage management software and/or can be scheduled to run automatically at certain dates and times. The method can be initiated manually by a user, for example, by entering a command in a command-line-interface or by clicking on a button or other object in a graphical user interface (GUI). Execution of the method can also be based on various other constraints. For example, the method can be configured to store IO data associated with one or more particular user applications, hosts, users, workload, and the like.

Referring to FIG. 11, at step 905, an IO data object such as an IO data block is received at a data storage system as a result of a host application write command. The IO block is received at a cache compression layer at step 910 where the IO data block is analyzed to determine if the data can be compressed using one or more compression algorithms. Some data may be significantly compressible, other data less so, and still other data (e.g., audio and video files) may not be compressible. Due to different compression rates, the resulting compressed IO data blocks may be different sizes; thus, compressed IO data blocks are variable sized blocks. Conversely, non-compressed IO data blocks are stored as received in fixed size blocks.

At step 915, the method determines if the IO block was previously written to and is still in a cache macroblock. That is, is the write operation overwriting an IO block currently in cache with modified data or writing a new IO block. If the IO block is a new write, the method proceeds to step 930 to determine if there is sufficient space to store the IO block in the appropriate compressed cache macroblock or non-compressed macroblock depending on whether the IO block was compressed or not. If there is sufficient space in the appropriate cache macroblock, the IO block is written to the cache macroblock at step 925 and corresponding cache metadata is updated accordingly.

If, at step 930, there is not enough space to allocate a new cache macroblock (i.e., the cache macroblock if full and is marked as read only), the method proceeds to step 935 to evict a cache macroblock from cache. The method will search for a cache macroblock that has all its block deleted. Such macroblocks can be identified by examining macroblock metadata bitmaps to identify a macroblock where all its blocks are marked as deleted. If such a cache macroblock is identified, that cache macroblock is discarded and its respective cache slot is reused. If a cache macroblock with all blocks deleted is not identified, the method targets an existing cache macroblock for eviction by analyzing cache macroblock metadata (e.g., IO counter, timestamp, etc.) to identify a less or least recently used cache macroblock. For example, a cache macroblock with the lowest number of blocks read or lowest number IOPS may be chosen for eviction. If the cache macroblock chosen to be evicted contains valid IO data blocks (e.g., IO counter indicates valid data exists), the cache macroblock is written to a corresponding persistent macroblock in backend persistent storage as is. That is, if it is a compressed macroblock, it is written in compressed format to a compressed persistent macroblock and if non-compressed, it is written to a non-compressed persistent macroblock. Upon eviction, the respective cache macroblock slot can be re-used as another cache macroblock. At step 925, the IO data block is written to the appropriate cache macroblock, be it compressed or non-compressed.

However, if, at step 915, the method determines the IO block was previously written to, and is still in, a cache macroblock, the size of the new IO block to be written is compared to the existing block size at step 920 and if less than or equal to the existing block size, it is written to a cache macroblock at step 925. Conversely, if, at step 920, the method determines that the new IO block size is greater the existing block size, the method proceeds to step 930 to determine if there is room in an existing cache macroblock, and if so, the IO block is written to identified existing cache macroblock. If there is not sufficient space in an existing cache macroblock to store the IO block, a cache macroblock is identified and evicted in the manner as was described above and the IO block is written to a newly allocated or reused cache macroblock. In either case, the IO block is stored in a 'new' location, therefore, a different IC-key identifying the blocks location is returned to the client application.

In addition, writes occurring in step 925 include updating a number of cache macroblock metadata fields. For example, a bit in the corresponding cache macroblock metadata is set to indicate if the cache macroblock contains compressed or non-compressed blocks. Bitmap bits corresponding to blocks packed in a cache macroblock are also set. For instance, if 12 blocks are packed into a cache macroblock, then the first 12 bits of N bitmap bits are set. When overwriting a block causes its location to change (e.g., the new IO block size is greater than its existing size as described in step 920), the bitmap for two cache macroblocks are changed—the bitmap for the "from" cache macroblock and the bitmap for the "to" macroblock. That is, the "from" bitmap bit of the overwritten block is set to 0 indicating the block has been deleted for the cache macroblock and the "to" bitmap bit for the block is set to 1. In addition, IO counters are incremented for write block request for cached macroblocks. Further, timestamp information (e.g., first request time, last access time, etc.) for IO requests are updated for cached macroblocks. Other fields may be appropriately updated to indicate IO data block activity. It should be noted that an IO block in a cache macroblock can be deleted by simply updating corresponding cache macroblock metadata for the IO block by setting the 'N' bit in its bitmap to indicate deletion (e.g., set to 0).

FIG. 12 illustrates a method 1000 depicting a read request operation employing techniques described herein. At step 1005, a read request is received at a data storage system from a host application. At step 1010, cache is searched using cache metadata to determine if the requested data object, such as an IO block, is stored in an IO cache macroblock and if so, a determination is made at step 1015 to identify whether the requested block is located in a compressed cache macroblock or a non-compressed cache macroblock. If the requested block is in a compressed cache macroblock, block size information stored in its cache macroblock header is used to locate and retrieved the requested block from the cache macroblock. The requested block is then decompressed via an in-line decompression operation at step 1035. At step 1040, associated cache metadata is updated and the requested block is returned to the requesting application. If, at step 1015, the requested block is not in a compressed cache macroblock—thus in a non-compressed cache macroblock—the non-compressed block is returned to the requesting host application as is and associated cache metadata is updated at step 1040.

However, if at step 1010, the requested block is not in cache, the method proceeds to step 1020 to determine if it is in a compressed or non-compressed macroblock in backend persistent storage. If the requested block is in a compressed persistent macroblock, the method attempts to locate free space in a compressed cache slot. Cache metadata is analyzed to identify an existing compressed cache macroblock having sufficient space to store the requested block. If a free cache slot is not available, an existing compressed cache macroblock is evicted using eviction routines described elsewhere herein and a new cache macroblock slot is made available and the persistent macroblock is copied to the new cache macroblock slot at step 1030. The requested block is then decompressed via an in-line decompression operation at step 1035. At step 1040, cache metadata is updated and the requested block is returned to the requesting application.

If, at step 1020, it is determined that the requested block is stored in a non-compressed persistent macroblock in backend persistent storage, the method attempts to locate free space in a non-compressed cache macroblock slot at step 1045. Cache metadata is analyzed to identify an existing non-compressed cache macroblock having sufficient space to store the requested block. If a free cache slot is not located, an existing non-compressed cache macroblock is evicted using eviction routines described elsewhere herein, a new non-compressed cache macroblock slot is made available and the persistent macroblock is copied to the new cache macroblock slot at step 1050. At step 1040, cache metadata is updated and the requested block is returned to the requesting application.

It should be noted that the techniques described above in conjunction with section 2. garbage collection and section 3. metadata structures may be used, or modified for use, with IO cache management techniques described in this section 4. cache macroblocks and should not be construed to being limited thereto.

5. Block Data Placement in Cache

Further alternative embodiments are directed to improved techniques of managing IO cache in data storage systems involving arranging cache into fixed size storage objects (e.g., IO cache macroblocks) comprising multiple sub-storage objects (e.g., IO data blocks) and selectively rearranging sub-storage objects having read access times that overlap each other into one or more other cache macroblocks. Advantageously, a data storage system operating according to the improved techniques is able to more efficiently read data blocks cache thereby improving overall system performance.

Log-based write system such as those described above, accumulate or arrange a set or group of data blocks into cache macroblocks. The blocks are written in a fairly sequential manner where a block writes are grouped or accumulated and written or arranged into a cache macroblock, the next group of blocks are arranged into the next macroblock and so on, the process repeating as new blocks are accumulated and arranged into cache macroblocks. At some point, a macroblock comprising group of data blocks is written to primary backend storage in a single write operation. In this way, multiple blocks can be written in a single write operation. As a result, overall write performance of the data storage system is significantly improved.

However, data block read requests may not access blocks in a similarly sequential manner. For example, consider the case where 3 read requests are received for 3 different data blocks. It is very likely that the 3 data blocks reside in 3 different macroblocks. Thus, 3 entire macroblocks need to be read to retrieve the 3 requested data blocks. In the case where a macroblock includes 8 blocks, 24 blocks need to be read in order to retrieve the 3 requested data blocks. As the number of blocks stored in a macroblock increase, read efficiency is decreased correspondingly. However, if the 3 data blocks are in the same macroblock, only that 1 macroblock need to be read, thereby reading 8 total blocks vs. the 24 blocks just described. Thus, read performance can vary depending on the IO temporal locality of blocks being read out of the macroblocks. Consequently, the lower the number macroblocks that need to be read in order to satisfy a read request, the higher the read efficiency.

Other data storage services may also impact read efficiency. For example, certain applications may write data such that data blocks are stored in a sequential order according to expected read patterns. However, after compression operations are performed, fixed size data blocks are compressed at various rates based on compression efficiency resulting in blocks having different, variable sizes. Some data blocks may be non-compressible so they will retain their original size. Some will be significantly reduced in size. Due to the variable size of data blocks after compression, "read-modify-overwrite in-place" may not be possible. As a result, blocks that were adjacent spatially or temporally when first written to cache are rewritten in log-like fashion such that they become quite reshuffled (i.e., no longer spatially or temporally adjacent) after overwriting. Garbage collection may also further reshuffle data blocks. The reshuffling can increase overhead when an application reads blocks in the same or similar logical order as they were written.

The techniques described herein operate on the premise that data blocks accessed together closely in time (i.e., have temporal locality) are likely to be similarly accessed in the future as compared with data blocks randomly or sequentially arranged into data blocks. As further described below, cache IO access statistics are used to reorder the layout of data blocks as stored on a storage device to improve IO temporal locality. In operation, as data blocks are accessed, access statistics for each data block are generated and temporarily stored in cache in, for example, block metadata. The statistics may then be extrapolated for use in re-arranging cached data blocks so that blocks having temporal locality are rearranged into a common macroblock. In other words, active blocks are rearranged into active macroblocks. The rearranged macroblocks can be written to storage system devices such that the number of macroblocks that need to be read to satisfy a read request can be reduced when reading data blocks from primary storage into cache.

Figure 13:
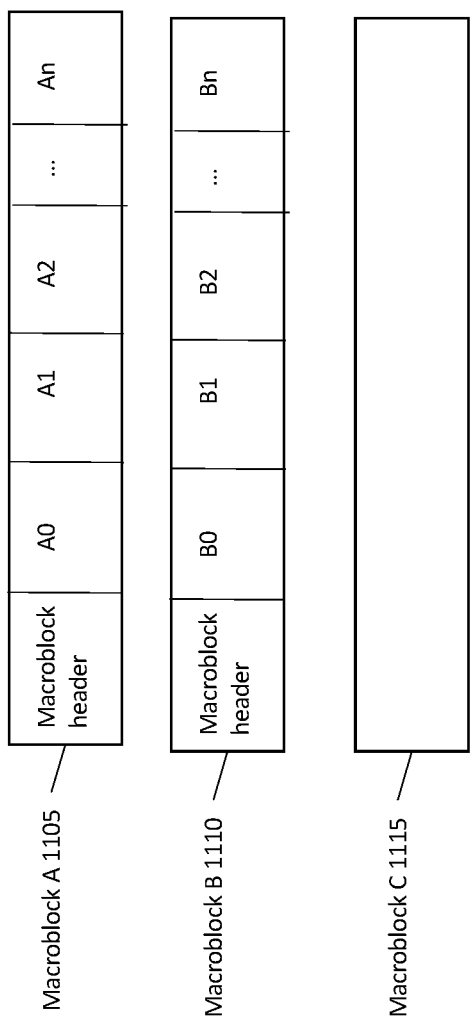
FIG. 13 depicts various macroblocks that may be used in an embodiment.

Block access timing diagrams may be used for carrying out the above-described improved techniques of managing IO cache in a data storage system. Referring to FIG. 13, macroblock A 1105 includes a macroblock header and multiple data blocks shown as block A0, A1, A2, . . . , An. The macroblocks may be arranged and configured in a manner as was described elsewhere herein. For example, macroblock A may include 8 data blocks, A0-A8. Other size macroblocks comprising more or less data blocks may be similarly employed. The blocks A0-An are shown with reference to time scale t_A0-t_Alast, where t_A0 is the time a data block in macroblock A was first accessed and t_Alast is the last time a data block in macroblock A was accessed.

Points for each data block represent read access times for the cache macroblock, where the left most point represents a time the associated data block was first accessed and the right most point represents the time the associated data block was last accessed. Such time values need not be absolute time values and may be relative time values, count values or the like. The time values can be determined using IO counters to determine the number of times a data block was accessed. In one example embodiment, first and last access time for blocks can be used to determine if the blocks overlap. For instance, using the collected access statistics, data block A5 has a last access time that occurs after, or overlaps, the first access time of A1. Similarly, A1 has a last access time that overlaps the first access time of block A3. Thus, using computationally efficient comparison operations, it can be determined that the access time for data block A5 has at least a portion access time that coincides or overlaps the access time of A1 and that the access intervals of data blocks A1 and A3 overlap each other.

Macroblock B 1110 is similarly arranged having a macroblock header and data blocks B0, B1, B2, . . . , Bn. Here, B1 is shown as having a last access time that ends after the first access time of data block B7. Thus, it can be determined that the access times of data blocks B1 and B7 in macroblock B overlap each other by comparing their access times. Although the examples describe comparing two access points, other points or combination of points may be compared or analyzed to identify overlapping data blocks.

Macroblock C 1115 can be arranged and configured for the purposes of storing data blocks having temporal locality to improve data storage system read performance. Such macroblocks may be referred to as 'overlap' cache macroblocks. Continuing with the example presented above, having previously determined that data blocks A5, A1 and A3 of macroblock A 1105 and data blocks B1 and B7 of macroblock B 1110 all have access time that overlap each other each other, the blocks are rearranged into macroblock C 115. Also note that the time between the first access time t_C0 of macroblock C 1115 and the last access time t_Clast has been reduced, indicating a higher degree of overlap for the blocks contained therein. As such, implementing overlap cache macroblocks can significantly improve read time performance. For instance, in the example above, with conventional methods, a read request for data blocks A1 and B1 require reading both macroblock A 1105 and macroblock B 110. By contrast, employing techniques described herein, a read request for data blocks A1 and B1 can be satisfied by reading macroblock C 1115 alone, thereby reading half the data conventional techniques require.

Figure 14:
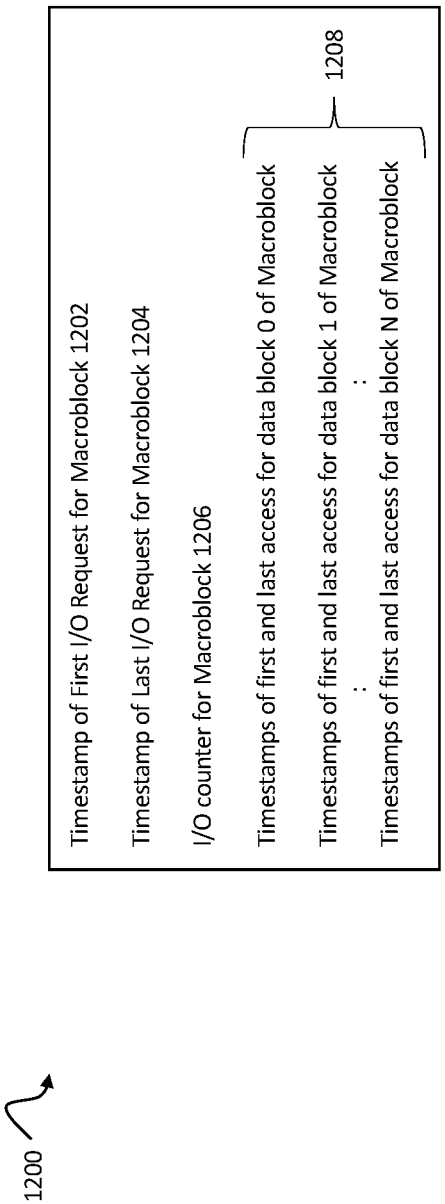
FIG. 14 depicts an example of a data structure that may be used in an embodiment.

FIG. 14 illustrates an example data structure 1200 for use in implementing an example embodiment of the techniques described herein. However, the techniques should not be construed to being limited to a specific data structure and the examples discussed are presented for explanatory purposes only. The data structure 1200 may be used in place of, or included as part of, data structures described elsewhere herein. As shown, the data structure 1200 includes a timestamp for the first TO request 1202 and a timestamp for the last TO request 1204 for a particular macroblock, such as the macroblocks discussed above. An TO counter 1206 for all blocks in the macroblock is provided. For each block (e.g., A0-An) in the macroblock, fields 1208 containing timestamps for each block's first access and last access are provided. These fields are analyzed to determine if one or more blocks have overlapping access times, and if so, the overlapping blocks are targeted for rearrangement into another one or more overlap cache macroblocks. Other fields, such as those described elsewhere herein, are provided for each block's cache slot may also be provided in the data structure 1200.

Figure 15:
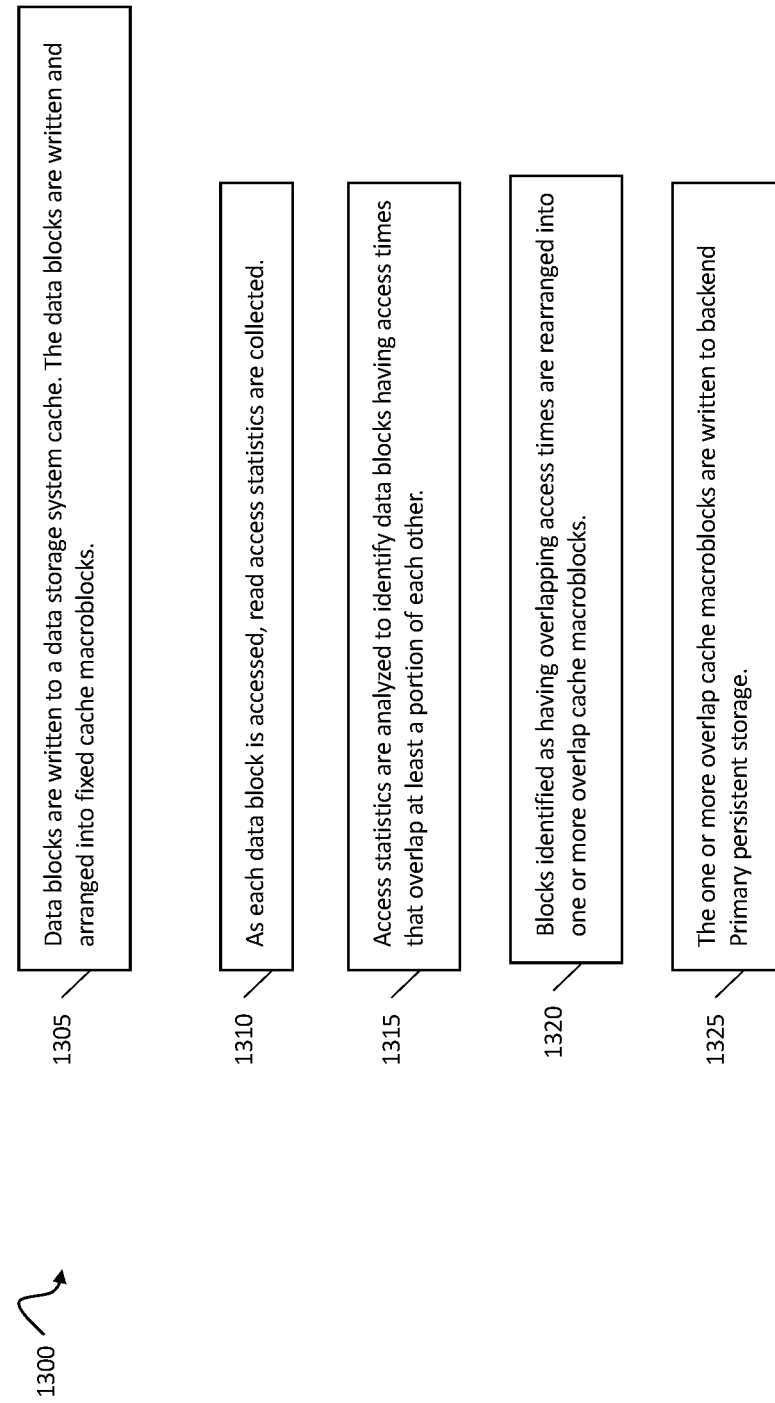
FIG. 15 depicts steps of a method according to an embodiment.

FIG. 15 is a flow diagram that illustrates an example method for rearranging data blocks in data storage systems similar to that shown in FIG. 10. The method 1300 can be initiated automatically by storage management software and/or can be scheduled to run automatically at certain dates and times. The method can be initiated manually by a user, for example, by entering a command in a command-line interface or by clicking on a button or other object in a graphical user interface (GUI). Execution of the method can also be based on various other constraints. For example, the method can be configured to store IO data associated with one or more particular user applications, hosts, users, workload, and the like.

At step 1305, data blocks are written to a data storage system cache by, for example, an application residing on a host. The multiple data blocks are written and arranged or organized into a fixed size cache macroblocks.

At step 1310, as each data block is accessed, read access statistics are collected and stored in a data structure such as that described in FIG. 14. The statistics may be derived from timers, clocks, and/or IO counters or other such indicators that can be used to determine block access parameters. At step 1315, the access statistics are analyzed to identify data blocks having access times that overlap at least a portion of each other. For example, the first and/or last time blocks are accessed may be compared between two blocks to determine if the blocks were accessed at the same time. At step 1320, blocks identified as having overlapping access times are rearranged into a one or more 'overlap' cache macroblocks. At step 1325, the one or more overlap cache macroblocks are written to backend primary persistent storage (i.e., destaged or flushed). Access statics for the data blocks in the destaged cache macroblock can be deleted just prior to, during, or some point after the destage operation. Alternatively, in the event a cache macroblock does not get destaged (e.g., a delete request if received before being destaged), access statistics may be deleted.

While various embodiments of the present disclosure have been particularly shown and described, it will be understood by those skilled in the art that various changes in form and details may be made therein without departing from the spirit and scope of the present disclosure as defined by the appended claims.

For example, although various embodiments have been described as being methods, software embodying these methods is also included. Thus, one embodiment includes a tangible non-transitory computer-readable storage medium (such as, for example, a hard disk, an optical disk, computer memory, flash memory, etc., for example memory 38 in FIG. 10) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "conventional," Applicants make no admission that such technique, method, apparatus, or other concept is actually prior art under 35 U.S.C. § 102 or 35 U.S.C. § 103, such determination being a legal determination that depends upon many factors, not all of which are known to Applicants at this time.

What is claimed is:

1. A method for managing data storage in a data storage system, the method comprising:
   a. Writing a plurality of data blocks to a data storage system cache, wherein the data storage system cache has a first fixed size cache macroblock and a second fixed size cache macroblock;
   b. Processing a first access request to read a first data block of the first fixed size cache macroblock;
   c. Recording a first temporal access statistic associated with the first access request to read the first data block of the first fixed size cache macroblock;
   d. Processing a second access request to read a second data block of the second fixed size cache macroblock;
   e. Recording a second temporal access statistic associated with the second access request to read the second data block of the second fixed size cache macroblock;
   f. Comparing the first temporal access statistic to the second temporal access statistic to determine if they overlap in time;

g. Identifying, based on said comparing, that the first data block of the first fixed size cache macroblock and the second data block of the second fixed size cache macroblock have overlapping access times; and h. Rearranging data blocks identified as having overlapping access times into an overlap cache macroblock located in the data storage system cache, wherein said rearranging includes storing the first data block of the first fixed size cache macroblock and the second data block of the second fixed size cache macroblock identified as having overlapping access times in the overlap cache macroblock; and i. Writing the overlap cache macroblock to a primary persistent storage and deleting the first temporal access statistic and the second temporal access statistic.

2. The method of claim 1, further comprising writing the overlap cache macroblock to a back-end hard disk drive.

3. The method of claim 1, further comprising:
a. determining that at least a portion of a persistent storage comprises a flash memory device; and
b. preventing copying a data block to the portion of the persistent storage comprising the flash memory device.

4. The method of claim 1, further comprising deleting the overlap cache macroblock if it is not written to the primary persistent storage after a threshold time limit.

5. The method of claim 1, further comprising creating a cache macroblock data structure, wherein the cache macroblock data structure includes metadata describing a plurality of access characteristics of the data blocks organized therein.

6. The method of claim 1 wherein the first fixed size cache macroblock is configured to store compressed data blocks and the second fixed size cache macroblock is configured to store uncompressed data blocks.

7. The method of claim 1 wherein the first fixed size cache macroblock is equal in size to the second fixed size cache macroblock.

8. A system for managing data storage in a data storage system, the system comprising a special purpose storage processor and memory configured to:
a. Write a plurality of data blocks to a data storage system cache, wherein the data storage system cache has a first fixed size cache macroblock and a second fixed size cache macroblock;
b. Process a first access request to read a first data block of the first fixed size cache macroblock;
c. Record a first temporal access statistic associated with the first access request to read the first data block of the first fixed size cache macroblock;
d. Process a second access request to read a second data block of the second fixed size cache macroblock;
e. Record a second temporal access statistic associated with the second access request to read the second data block of the second fixed size cache macroblock;
f. Compare the first temporal access statistic to the second temporal access statistic to determine if they overlap in time;
g. Identify, based on said comparing, that the first data block of the first fixed size cache macroblock and the second data block of the second fixed size cache macroblock have overlapping access times; and
h. Rearrange data blocks identified as having overlapping access times into an overlap cache macroblock located in the data storage system cache, wherein said rearranging includes storing the first data block of the first fixed size cache macroblock and the second data block of the second fixed size cache macroblock identified as having overlapping access times in the overlap cache macroblock; and
i. Write the overlap cache macroblock to a primary persistent storage and delete the first temporal access statistic and the second temporal access statistic.

9. The system of claim 8 wherein the special purpose storage processor and memory are further configured to write the overlap cache macroblock to a back-end hard disk drive.

10. The system of claim 8 wherein the special purpose storage processor and memory are further configured to determine whether at least a portion of a persistent storage comprises a flash memory device and prevent copying a data block to the portion of the persistent storage comprising the flash memory device.

11. The system of claim 8 wherein the special purpose storage processor and memory are further configured to delete the overlap cache macroblock if it is not written to the primary persistent storage after a threshold time limit.

12. The system of claim 8 wherein the special purpose storage processor and memory are further configured to create a cache macroblock data structure, wherein the cache macroblock data structure includes metadata describing a plurality of access characteristics of the data blocks organized therein.

13. The system of claim 8 wherein the first fixed size cache macroblock is configured to store compressed data blocks and the second fixed size cache macroblock is configured to store uncompressed data blocks.

14. The system of claim 8 wherein the first fixed size cache macroblock is equal in size to the second fixed size cache macroblock.

15. A non-transitory computer readable medium comprising code stored thereon that, when executed, performs a method for managing data storage in a data storage system, the method comprising:
a. Writing a plurality of data blocks to a data storage system cache, wherein the data storage system cache has a first fixed size cache macroblock and a second fixed size cache macroblock;
b. Processing a first access request to read a first data block of the first fixed size cache macroblock;
c. Recording a first temporal access statistic associated with the first access request to read the first data block of the first fixed size cache macroblock;
d. Processing a second access request to read a second data block of the second fixed size cache macroblock;
e. Recording a second temporal access statistic associated with the second access request to read the second data block of the second fixed size cache macroblock;
f. Comparing the first temporal access statistic to the second temporal access statistic to determine if they overlap in time;
g. Identifying, based on said comparing, that the first data block of the first fixed size cache macroblock and the second data block of the second fixed size cache macroblock have overlapping access times; and
h. Rearranging data blocks identified as having overlapping access times into an overlap cache macroblock located in the data storage system cache, wherein said rearranging includes storing the first data block of the first fixed size cache macroblock and the second data block of the second fixed size cache macroblock identified as having overlapping access times in the overlap cache macroblock; and i. Writing the overlap cache macroblock to a primary persistent storage and deleting the first temporal access statistic and the second temporal access statistic.

* * * * *